United States Patent
Johnson et al.

(10) Patent No.: US 10,210,478 B2
(45) Date of Patent: *Feb. 19, 2019

(54) CONTINUOUS DISPLAY SHELF EDGE LABEL DEVICE

(71) Applicant: RTC Industries, Inc., Rolling Meadows, IL (US)

(72) Inventors: Bradley Thomas Johnson, Crystal Lake, IL (US); John Wesley Swafford, Jr., Palatine, IL (US); Michael Alvin Lembke, Rouselle, IL (US); Joseph Christian Ernest, Woodstock, IL (US)

(73) Assignee: RTC Industries, Inc., Rolling Meadows, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/899,163

(22) Filed: Feb. 19, 2018

(65) Prior Publication Data

US 2018/0189727 A1    Jul. 5, 2018

Related U.S. Application Data

(63) Continuation of application No. 13/836,680, filed on Mar. 15, 2013, now Pat. No. 9,898,712, which is a (Continued)

(51) Int. Cl.
*G06Q 10/00* (2012.01)
*G06Q 10/08* (2012.01)
(Continued)

(52) U.S. Cl.
CPC .......... *G06Q 10/087* (2013.01); *G06Q 30/02* (2013.01); *G09G 5/14* (2013.01); *A47F 1/126* (2013.01);
(Continued)

(58) Field of Classification Search
CPC ...................................................... G06Q 20/00
(Continued)

(56) References Cited

U.S. PATENT DOCUMENTS

| 154,940 | A | 9/1874 | Adams |
| 355,511 | A | 1/1887 | Danner |

(Continued)

FOREIGN PATENT DOCUMENTS

| BE | 906083 A2 | 4/1987 |
| BE | 1008382 A3 | 4/1996 |

(Continued)

OTHER PUBLICATIONS

Mar. 14, 2018—(EP) Communication Pursuant to Article 94(3) EPC—App 15798644.9.

(Continued)

*Primary Examiner* — Russell S Glass
(74) *Attorney, Agent, or Firm* — Banner & Witcoff, Ltd.

(57) ABSTRACT

A method and apparatus for providing information along a shelf edge of a retailer is described. On a display configured to be oriented along an edge of a shelf of a retailer, a first user interface including first information about a first product on the shelf is provided. At least one second user interface including at least one second information about at least one second product on the shelf is provided on the display. An individual is permitted to edit a parameter of the first user interface and/or the at least one second user interface. The parameter may include at least one of: a size of the user interface on the display, a shape of the user interface on the display, and a location of the user interface on the display. The first information and the at least one second information may be outputted concurrently to the display.

25 Claims, 14 Drawing Sheets

Related U.S. Application Data continuation-in-part of application No. 13/194,649, filed on Jul. 29, 2011, now Pat. No. 8,812,378, which is a continuation of application No. 12/876,919, filed on Sep. 7, 2010, now Pat. No. 8,938,396, which is a continuation-in-part of application No. 10/772,010, filed on Feb. 3, 2004, now Pat. No. 7,792,711, said application No. 13/836,680 is a continuation-in-part of application No. 13/785,082, filed on Mar. 5, 2013, now Pat. No. 9,818,148.

(60) Provisional application No. 61/371,417, filed on Aug. 6, 2010.

(51) Int. Cl.
*G06Q 30/02* (2012.01)
*G09G 5/14* (2006.01)
*A47F 1/12* (2006.01)
*G06F 3/147* (2006.01)

(52) U.S. Cl.
CPC ..... *G06F 3/147* (2013.01); *G09G 2340/0464* (2013.01); *G09G 2340/14* (2013.01); *G09G 2354/00* (2013.01); *G09G 2380/04* (2013.01)

(58) Field of Classification Search
USPC .......................................................... 705/27
See application file for complete search history.

(56) References Cited

U.S. PATENT DOCUMENTS

| | | |
|---|---|---|
| 632,231 A | 12/1905 | Blades |
| 808,067 A | 12/1905 | Briggs |
| 847,863 A | 3/1907 | Watts |
| 1,156,140 A | 10/1915 | Hair |
| 1,682,580 A | 8/1928 | Pratt |
| 1,703,987 A | 3/1929 | Butler |
| 1,712,080 A | 5/1929 | Kelly |
| 1,714,266 A | 5/1929 | Johnson |
| 1,734,031 A | 11/1929 | Carlston |
| 1,786,392 A | 12/1930 | Kemp |
| 1,964,597 A | 6/1934 | Rapellin |
| 1,971,749 A | 8/1934 | Hamilton |
| 1,991,102 A | 2/1935 | Kemaghan |
| 2,057,627 A | 10/1936 | Ferris |
| 2,079,754 A | 5/1937 | Waxgiser |
| 2,085,479 A | 6/1937 | Shaffer et al. |
| 2,110,299 A | 3/1938 | Hinkle |
| 2,111,496 A | 3/1938 | Scriba |
| 2,129,122 A | 9/1938 | Follett |
| 2,185,605 A | 1/1940 | Murphy |
| 2,218,444 A | 10/1940 | Vineyard |
| 2,499,088 A | 2/1950 | Brill |
| 2,516,122 A | 7/1950 | Hughes |
| 2,538,165 A | 1/1951 | Randtke |
| 2,555,102 A | 5/1951 | Anderson |
| 2,563,570 A | 8/1951 | Williams |
| 2,652,154 A | 9/1953 | Stevens |
| 2,670,853 A | 3/1954 | Schneider |
| 2,678,045 A | 5/1954 | Erhard |
| 2,732,952 A | 1/1956 | Skelton |
| 2,738,881 A | 3/1956 | Michel |
| 2,750,049 A | 6/1956 | Hunter |
| 2,775,365 A | 12/1956 | Mestman |
| 2,893,596 A | 7/1959 | Gabrielsen |
| 2,918,295 A | 12/1959 | Milner |
| 2,934,212 A | 4/1960 | Jacobson |
| 2,948,403 A | 8/1960 | Vallez |
| 2,964,154 A | 12/1960 | Erickson |
| 3,083,067 A | 3/1963 | Vos et al. |
| 3,103,396 A | 9/1963 | Portnoy |
| 3,151,576 A | 10/1964 | Patterson |
| 3,161,295 A | 12/1964 | Chesley |
| 3,166,195 A | 1/1965 | Taber |
| 3,285,429 A | 11/1966 | Propst |
| 3,308,961 A | 3/1967 | Chesley |
| 3,308,964 A | 3/1967 | Pistone |
| 3,348,732 A | 10/1967 | Shwarz |
| 3,405,716 A | 10/1968 | Cafiero |
| 3,452,899 A | 7/1969 | Libberton |
| 3,497,081 A | 2/1970 | Field |
| 3,501,020 A | 3/1970 | Krikorian |
| D219,058 S | 10/1970 | Kaczur |
| 3,550,979 A | 12/1970 | Protzmann |
| 3,598,246 A | 8/1971 | Galli |
| 3,652,154 A | 3/1972 | Gebel |
| 3,667,826 A | 6/1972 | Wood |
| 3,698,568 A | 10/1972 | Armstrong |
| 3,709,371 A | 1/1973 | Luck |
| 3,724,715 A | 4/1973 | Auriemma |
| 3,751,129 A | 8/1973 | Wright et al. |
| 3,767,083 A | 10/1973 | Webb |
| 3,814,490 A | 6/1974 | Dean et al. |
| 3,815,519 A | 6/1974 | Meyer |
| 3,830,169 A | 8/1974 | Madey |
| 3,848,745 A | 11/1974 | Smith |
| 3,868,021 A | 2/1975 | Heinrich |
| 3,870,156 A | 3/1975 | O'Neill |
| 4,007,841 A | 2/1977 | Seipel |
| 4,042,096 A | 8/1977 | Smith |
| 4,106,668 A | 8/1978 | Gebhardt et al. |
| 4,269,326 A | 5/1981 | Delbrouck |
| 4,300,693 A | 11/1981 | Spamer |
| 4,303,162 A | 12/1981 | Suttles |
| 4,314,700 A | 2/1982 | Dylag |
| 4,331,243 A | 5/1982 | Doll |
| 4,351,439 A | 9/1982 | Taylor |
| 4,378,872 A | 4/1983 | Brown |
| 4,448,653 A | 5/1984 | Wegmann |
| 4,454,948 A | 6/1984 | Spamer |
| 4,460,096 A | 7/1984 | Ricci |
| 4,463,854 A | 8/1984 | MacKenzie |
| 4,467,927 A | 8/1984 | Nathan |
| 4,476,985 A | 10/1984 | Norberg et al. |
| 4,482,066 A | 11/1984 | Dykstra |
| 4,488,653 A | 12/1984 | Belokin |
| 4,504,100 A | 3/1985 | Chaumard |
| 4,588,093 A | 5/1986 | Field |
| 4,589,349 A | 5/1986 | Gebhardt et al. |
| 4,602,560 A | 7/1986 | Jacky |
| 4,615,276 A | 10/1986 | Garabedian |
| 4,620,489 A | 11/1986 | Albano |
| 4,629,072 A | 12/1986 | Loew |
| 4,651,883 A | 3/1987 | Gullett et al. |
| 4,685,574 A | 8/1987 | Young et al. |
| 4,705,175 A | 11/1987 | Howard et al. |
| 4,706,821 A | 11/1987 | Kohls et al. |
| 4,724,968 A | 2/1988 | Wombacher |
| 4,729,481 A | 3/1988 | Hawkinson et al. |
| 4,730,741 A | 3/1988 | Jackle, III et al. |
| 4,742,936 A | 5/1988 | Rein |
| 4,762,235 A | 8/1988 | Howard et al. |
| 4,762,236 A | 8/1988 | Jackle, III et al. |
| 4,768,661 A | 9/1988 | Pfeifer |
| 4,775,058 A | 10/1988 | Yatsko |
| 4,776,472 A | 10/1988 | Rosen |
| 4,790,037 A | 12/1988 | Phillips |
| 4,809,856 A | 3/1989 | Muth |
| 4,828,144 A | 5/1989 | Garrick |
| 4,830,201 A | 5/1989 | Breslow |
| 4,836,390 A | 6/1989 | Polvere |
| 4,846,367 A | 7/1989 | Guigan et al. |
| 4,883,169 A | 11/1989 | Flanagan, Jr. |
| 4,899,668 A | 2/1990 | Valiulis |
| 4,901,853 A | 2/1990 | Maryatt |
| 4,901,869 A | 2/1990 | Hawkinson et al. |
| 4,907,707 A | 3/1990 | Crum |
| 4,934,645 A | 6/1990 | Breslow |
| 4,954,697 A | 9/1990 | Kokubun et al. |
| 5,009,334 A | 4/1991 | Bodkins |
| 5,012,936 A | 5/1991 | Crum |
| 5,025,936 A | 6/1991 | Lamoureaux |

(56) References Cited

U.S. PATENT DOCUMENTS

| | | |
|---|---|---|
| 5,027,957 A | 7/1991 | Skalski |
| 5,082,125 A | 1/1992 | Ninni |
| 5,088,607 A | 2/1992 | Risafi et al. |
| 5,110,192 A | 5/1992 | Lauterbach |
| 5,111,942 A | 5/1992 | Bernardin |
| 5,123,546 A | 6/1992 | Crum |
| 5,148,927 A | 9/1992 | Gebka |
| 5,161,702 A | 11/1992 | Skalski |
| 5,172,314 A | 12/1992 | Poland et al. |
| 5,178,258 A | 1/1993 | Smalley et al. |
| 5,183,166 A | 2/1993 | Belokin, Jr. et al. |
| 5,190,186 A | 3/1993 | Yablans et al. |
| 5,203,463 A | 4/1993 | Gold |
| 5,215,199 A | 6/1993 | Bejarano |
| 5,240,126 A | 8/1993 | Foster et al. |
| 5,255,802 A | 10/1993 | Krinke et al. |
| 5,257,090 A | 10/1993 | Meinzer et al. |
| 5,265,738 A | 11/1993 | Yablans et al. |
| 5,316,154 A | 5/1994 | Hajec, Jr. |
| 5,341,945 A | 8/1994 | Gibson |
| 5,351,839 A | 10/1994 | Beeler et al. |
| 5,366,099 A | 11/1994 | Schmid |
| 5,381,908 A | 1/1995 | Hepp |
| 5,390,802 A | 2/1995 | Pappagallo et al. |
| 5,413,229 A | 5/1995 | Zuberbuhler et al. |
| 5,415,297 A | 5/1995 | Klein et al. |
| 5,448,226 A | 9/1995 | Failing, Jr. et al. |
| 5,450,969 A | 9/1995 | Johnson et al. |
| 5,458,248 A | 10/1995 | Alain |
| 5,464,105 A | 11/1995 | Mandeltort |
| 5,469,975 A | 11/1995 | Fajnsztajn |
| 5,469,976 A | 11/1995 | Burchell |
| 5,537,312 A | 7/1996 | Sekiguchi et al. |
| 5,542,552 A | 8/1996 | Yablans et al. |
| 5,548,282 A | 8/1996 | Escritt et al. |
| 5,562,217 A | 10/1996 | Salveson et al. |
| 5,613,621 A | 3/1997 | Gervasi et al. |
| D378,888 S | 4/1997 | Bertilsson |
| 5,615,780 A | 4/1997 | Nimetz et al. |
| 5,634,564 A | 6/1997 | Spamer et al. |
| 5,638,963 A | 6/1997 | Finnelly et al. |
| 5,665,304 A | 9/1997 | Heinen et al. |
| 5,671,362 A | 9/1997 | Cowe et al. |
| 5,671,851 A | 9/1997 | Johnson et al. |
| 5,673,801 A | 10/1997 | Markson |
| D386,363 S | 11/1997 | Dardashti |
| 5,685,664 A | 11/1997 | Parham et al. |
| 5,730,320 A | 3/1998 | David |
| 5,737,504 A | 4/1998 | Yamada |
| 5,738,019 A | 4/1998 | Parker |
| 5,740,944 A | 4/1998 | Crawford |
| 5,743,428 A | 4/1998 | Rankin, VI |
| 5,746,328 A | 5/1998 | Beeler et al. |
| 5,788,090 A | 8/1998 | Kajiwara |
| 5,803,276 A | 9/1998 | Vogler |
| 5,826,731 A | 10/1998 | Dardashti |
| 5,839,588 A | 11/1998 | Hawkinson |
| 5,855,283 A | 1/1999 | Johnson |
| 5,859,414 A | 1/1999 | Grimes et al. |
| 5,873,473 A | 2/1999 | Pater |
| 5,878,895 A | 3/1999 | Springs |
| 5,880,449 A | 3/1999 | Teicher et al. |
| 5,906,283 A | 5/1999 | Kump et al. |
| 5,933,813 A | 8/1999 | Teicher et al. |
| 5,963,134 A | 10/1999 | Bowers et al. |
| 5,971,204 A | 10/1999 | Apps |
| 5,992,652 A | 11/1999 | Springs |
| 5,992,653 A | 11/1999 | Anderson et al. |
| 6,006,678 A | 12/1999 | Merit et al. |
| 6,041,720 A | 3/2000 | Hardy |
| 6,076,670 A | 6/2000 | Yeranossian |
| 6,082,557 A | 7/2000 | Leahy |
| 6,082,558 A | 7/2000 | Battaglia |
| 6,089,385 A | 7/2000 | Nozawa |
| 6,105,004 A | 8/2000 | Halperin et al. |
| 6,105,791 A | 8/2000 | Chalson et al. |
| 6,112,938 A | 9/2000 | Apps |
| 6,129,218 A | 10/2000 | Henry et al. |
| 6,142,317 A | 11/2000 | Merl |
| 6,158,598 A | 12/2000 | Josefsson |
| 6,164,491 A | 12/2000 | Bustos et al. |
| 6,173,845 B1 | 1/2001 | Higgins et al. |
| 6,209,733 B1 | 4/2001 | Higgins et al. |
| 6,227,385 B1 | 5/2001 | Nickerson |
| 6,234,325 B1 | 5/2001 | Higgins et al. |
| 6,234,326 B1 | 5/2001 | Higgins et al. |
| 6,234,328 B1 | 5/2001 | Mason |
| 6,253,190 B1 | 6/2001 | Sutherland |
| D445,615 S | 7/2001 | Burke |
| 6,253,954 B1 | 7/2001 | Yasaka |
| 6,269,285 B1 | 7/2001 | Mignault |
| 6,289,326 B1 | 9/2001 | LaFleur |
| 6,357,606 B1 | 3/2002 | Henry |
| 6,378,727 B1 | 4/2002 | Dupuis et al. |
| 6,382,431 B1 | 5/2002 | Burke |
| 6,389,991 B1 | 5/2002 | Morrisson |
| 6,401,942 B1 | 6/2002 | Eckert |
| 6,405,880 B1 | 6/2002 | Webb |
| 6,409,026 B2 | 6/2002 | Watanabe |
| 6,409,027 B1 | 6/2002 | Chang et al. |
| 6,409,028 B2 | 6/2002 | Nickerson |
| 6,464,089 B1 | 10/2002 | Rankin, VI |
| 6,484,891 B2 | 11/2002 | Burke |
| 6,497,326 B1 | 12/2002 | Osawa |
| 6,497,367 B2 | 12/2002 | Conzola et al. |
| 6,507,352 B1 | 1/2003 | Cohen et al. |
| 6,523,664 B2 | 2/2003 | Shaw et al. |
| 6,523,703 B1 | 2/2003 | Robertson |
| 6,527,127 B2 | 3/2003 | Dumontet |
| 6,533,131 B2 | 3/2003 | Bada |
| 6,536,658 B1 | 3/2003 | Rantze |
| D472,411 S | 4/2003 | Burke |
| 6,550,674 B1 | 4/2003 | Neumark |
| 6,598,754 B2 | 7/2003 | Weiler |
| 6,622,874 B1 | 9/2003 | Hawkinson |
| 6,655,536 B2 | 12/2003 | Jo et al. |
| 6,666,533 B1 | 12/2003 | Stavros |
| D485,699 S | 1/2004 | Mueller et al. |
| 6,717,516 B2 | 4/2004 | Bridgelall |
| 6,738,628 B1 | 5/2004 | McCall et al. |
| 6,772,888 B2 | 8/2004 | Burke |
| 6,830,157 B2 | 12/2004 | Robertson et al. |
| 6,866,156 B2 | 3/2005 | Nagel et al. |
| 6,886,699 B2 | 5/2005 | Johnson et al. |
| 6,889,854 B2 | 5/2005 | Burke |
| 6,897,763 B2 | 5/2005 | Schulmerich et al. |
| 6,914,648 B2 | 7/2005 | Niiyama et al. |
| 6,948,900 B1 | 9/2005 | Neuman |
| 6,964,235 B2 | 11/2005 | Hardy |
| 7,002,451 B2 | 2/2006 | Freeman |
| 7,084,769 B2 | 8/2006 | Bauer et al. |
| 7,090,125 B2 | 8/2006 | Goel et al. |
| 7,093,546 B2 | 8/2006 | Hardy |
| 7,114,606 B2 | 10/2006 | Shaw et al. |
| 7,152,040 B1 | 12/2006 | Hawthorne et al. |
| 7,152,791 B2 | 12/2006 | Chappidi et al. |
| 7,155,238 B2 | 12/2006 | Katz |
| 7,216,770 B2 | 5/2007 | Mueller et al. |
| 7,252,230 B1 | 8/2007 | Sheikh et al. |
| 7,319,397 B2 | 1/2008 | Chung et al. |
| 7,400,251 B2 | 7/2008 | Czyszczewski et al. |
| 7,458,473 B1 | 12/2008 | Mason |
| 7,493,336 B2 | 2/2009 | Noonan |
| 7,520,429 B2 | 4/2009 | Koster |
| 7,526,762 B1 | 4/2009 | Astala et al. |
| 7,542,283 B1 | 6/2009 | Curran et al. |
| 7,565,108 B2 | 7/2009 | Kotola et al. |
| 7,580,845 B2 | 8/2009 | Burman et al. |
| 7,614,065 B2 | 11/2009 | Weissmueller, Jr. et al. |
| 7,641,057 B2 | 1/2010 | Mueller et al. |
| 7,675,422 B2 | 3/2010 | Stevens et al. |
| 7,686,185 B2 | 3/2010 | Zychinski |
| 7,743,984 B2 | 6/2010 | Olsen et al. |
| 7,775,130 B2 | 8/2010 | Harish et al. |

(56) References Cited

U.S. PATENT DOCUMENTS

| | | |
|---|---|---|
| 7,775,430 B2 | 8/2010 | Lin |
| 7,792,711 B2 | 9/2010 | Swafford, Jr. et al. |
| 7,815,060 B2 | 10/2010 | Iellimo |
| 7,823,734 B2 | 11/2010 | Hardy |
| 7,837,106 B2 | 11/2010 | Fabre et al. |
| 7,853,477 B2 | 12/2010 | O'Shea et al. |
| 7,864,041 B2 | 1/2011 | Godlewski |
| 7,896,172 B1 | 3/2011 | Hester |
| 7,904,333 B1 | 3/2011 | Perkowski |
| 7,982,622 B2 | 7/2011 | Burchell et al. |
| 8,089,357 B2 | 1/2012 | Irmscher et al. |
| 8,135,482 B2 | 3/2012 | Caldwell et al. |
| 8,144,245 B2 | 3/2012 | Vik |
| 8,171,142 B2 | 5/2012 | Kolin et al. |
| 8,184,005 B2 | 5/2012 | Kamel |
| 8,207,819 B2 | 6/2012 | Bonner et al. |
| 8,219,558 B1 | 7/2012 | Trandal et al. |
| 8,231,017 B2 | 7/2012 | Clontz et al. |
| 8,255,500 B2 | 8/2012 | Cacheria, III et al. |
| 8,280,784 B2 | 10/2012 | Hurtis et al. |
| 8,284,059 B2 | 10/2012 | Ross |
| 8,284,061 B1 | 10/2012 | Dione |
| 8,312,999 B2 | 11/2012 | Hardy |
| 8,321,302 B2 | 11/2012 | Bauer et al. |
| 8,322,544 B2 | 12/2012 | Hardy |
| 8,342,340 B2 | 1/2013 | Ratajczak, III et al. |
| 8,376,154 B2 | 2/2013 | Sun |
| 8,410,931 B2 | 4/2013 | Petite et al. |
| 8,463,431 B2 | 6/2013 | Segal et al. |
| 8,629,772 B2 | 1/2014 | Valiulis et al. |
| 8,662,325 B2 | 3/2014 | Davis et al. |
| 8,698,606 B2 | 4/2014 | Choi et al. |
| 8,739,984 B2 | 6/2014 | Hardy |
| 8,751,318 B2 | 6/2014 | Kim et al. |
| 8,781,622 B2 | 7/2014 | Mockus et al. |
| 8,810,392 B1 | 8/2014 | Teller et al. |
| 8,844,431 B2 | 9/2014 | Davis et al. |
| 8,978,904 B2 | 3/2015 | Hardy |
| 9,167,916 B2 | 10/2015 | Grant et al. |
| 9,318,007 B2 | 4/2016 | Valiulis et al. |
| 9,318,008 B2 | 4/2016 | Valiulis et al. |
| 9,898,712 B2 * | 2/2018 | Johnson ................. G06Q 30/02 |
| 2001/0010302 A1 | 8/2001 | Nickerson |
| 2001/0017284 A1 | 8/2001 | Watanabe |
| 2001/0051901 A1 | 12/2001 | Hager et al. |
| 2002/0036178 A1 | 3/2002 | Tombu |
| 2002/0108916 A1 | 8/2002 | Nickerson |
| 2002/0148794 A1 | 10/2002 | Marihugh |
| 2002/0158133 A1 | 10/2002 | Conzola et al. |
| 2002/0170866 A1 | 11/2002 | Johnson et al. |
| 2002/0178013 A1 | 11/2002 | Hoffman et al. |
| 2003/0000956 A1 | 1/2003 | Maldonado |
| 2003/0010732 A1 | 1/2003 | Burke |
| 2003/0053014 A1 | 3/2003 | Niiyama et al. |
| 2003/0055727 A1 | 3/2003 | Walker et al. |
| 2003/0057167 A1 | 3/2003 | Johnson et al. |
| 2003/0061973 A1 | 4/2003 | Bustos |
| 2003/0078691 A1 | 4/2003 | Holt et al. |
| 2003/0085187 A1 | 5/2003 | Johnson et al. |
| 2003/0106867 A1 | 6/2003 | Caterinacci |
| 2003/0141265 A1 | 7/2003 | Jo et al. |
| 2003/0150829 A1 | 8/2003 | Linden et al. |
| 2003/0193481 A1 | 10/2003 | Sokolsky |
| 2003/0217980 A1 | 11/2003 | Johnson et al. |
| 2003/0233288 A1 | 12/2003 | Sweeney et al. |
| 2004/0104239 A1 | 6/2004 | Black et al. |
| 2004/0118795 A1 | 6/2004 | Burke |
| 2004/0140278 A1 | 7/2004 | Mueller et al. |
| 2004/0140279 A1 | 7/2004 | Mueller et al. |
| 2004/0145451 A1 | 7/2004 | Failing |
| 2004/0178156 A1 | 9/2004 | Knorring et al. |
| 2004/0245197 A1 | 12/2004 | McElvaney |
| 2004/0260572 A1 | 12/2004 | George et al. |
| 2005/0077259 A1 | 4/2005 | Menz |
| 2005/0092702 A1 | 5/2005 | Nagel |
| 2005/0108098 A1 | 5/2005 | Syed et al. |
| 2005/0131578 A1 | 6/2005 | Weaver |
| 2005/0165649 A1 | 7/2005 | Mahaffey et al. |
| 2005/0168345 A1 | 8/2005 | Swafford et al. |
| 2005/0190072 A1 | 9/2005 | Brown et al. |
| 2005/0195081 A1 | 9/2005 | Studnicki et al. |
| 2005/0228718 A1 | 10/2005 | Austin |
| 2005/0279722 A1 | 12/2005 | Ali |
| 2006/0049122 A1 | 3/2006 | Mueller et al. |
| 2006/0071774 A1 | 4/2006 | Brown et al. |
| 2006/0102718 A1 | 5/2006 | Kajino et al. |
| 2006/0163272 A1 | 7/2006 | Gamble |
| 2006/0163349 A1 | 7/2006 | Neugebauer |
| 2006/0186064 A1 | 8/2006 | Merit et al. |
| 2006/0237381 A1 | 10/2006 | Lockwood et al. |
| 2006/0279527 A1 | 12/2006 | Zehner et al. |
| 2006/0289637 A1 | 12/2006 | Brice et al. |
| 2007/0016494 A1 | 1/2007 | Brown et al. |
| 2007/0159298 A1 | 7/2007 | Zegelin et al. |
| 2007/0194037 A1 | 8/2007 | Close |
| 2007/0278164 A1 | 12/2007 | Lang et al. |
| 2008/0074264 A1 | 3/2008 | Sharpe et al. |
| 2008/0142458 A1 | 6/2008 | Medcalf |
| 2008/0164310 A1 | 7/2008 | Dupuy et al. |
| 2008/0208695 A1 | 8/2008 | Condron |
| 2008/0228346 A1 | 9/2008 | Lucas et al. |
| 2008/0249658 A1 | 10/2008 | Walker et al. |
| 2008/0250464 A1 | 10/2008 | Masucci et al. |
| 2008/0255894 A1 | 10/2008 | Falls et al. |
| 2008/0303637 A1 | 12/2008 | Gelbman et al. |
| 2009/0020548 A1 | 1/2009 | VanDruff |
| 2009/0084812 A1 | 4/2009 | Kirschner |
| 2009/0101606 A1 | 4/2009 | Olson |
| 2009/0133301 A1 | 5/2009 | Saxena et al. |
| 2009/0134103 A1 | 5/2009 | Saxena et al. |
| 2009/0157515 A1 | 6/2009 | Lafauci et al. |
| 2009/0179825 A1 | 7/2009 | Enarvi et al. |
| 2009/0248198 A1 | 10/2009 | Siegel et al. |
| 2009/0287992 A1 | 11/2009 | Bresolin et al. |
| 2009/0313365 A1 | 12/2009 | Whitehead |
| 2009/0319399 A1 | 12/2009 | Resta et al. |
| 2010/0017025 A1 | 1/2010 | Lockwood et al. |
| 2010/0072152 A1 | 3/2010 | Kim |
| 2010/0100460 A1 | 4/2010 | Aronson |
| 2010/0106588 A1 | 4/2010 | Jones et al. |
| 2010/0106662 A1 | 4/2010 | Ramaswamy |
| 2010/0108624 A1 | 5/2010 | Sparkowski |
| 2010/0133214 A1 | 6/2010 | Evans |
| 2010/0138304 A1 | 6/2010 | Boyarsky et al. |
| 2010/0169189 A1 | 7/2010 | Allison et al. |
| 2010/0169190 A1 | 7/2010 | Allison et al. |
| 2010/0176075 A1 | 7/2010 | Nagel et al. |
| 2010/0200526 A1 | 8/2010 | Barkdoll |
| 2010/0205045 A1 | 8/2010 | Zhang et al. |
| 2010/0206829 A1 | 8/2010 | Clements et al. |
| 2010/0258513 A1 | 10/2010 | Meyer et al. |
| 2010/0262554 A1 | 10/2010 | Elliott |
| 2010/0276383 A1 | 11/2010 | Hardy |
| 2011/0010271 A1 | 1/2011 | Black et al. |
| 2011/0017532 A1 | 1/2011 | Langford et al. |
| 2011/0018685 A1 | 1/2011 | Tanaka et al. |
| 2011/0022980 A1 | 1/2011 | Segal et al. |
| 2011/0106653 A1 | 5/2011 | Wein |
| 2011/0128378 A1 | 6/2011 | Raji |
| 2011/0161146 A1 | 6/2011 | Walker et al. |
| 2011/0178863 A1 | 7/2011 | Daigle |
| 2011/0234514 A1 | 9/2011 | Gothard |
| 2011/0251920 A1 | 10/2011 | Watson |
| 2011/0304316 A1 | 12/2011 | Hachmann et al. |
| 2012/0004769 A1 | 1/2012 | Hallenbeck et al. |
| 2012/0044056 A1 | 2/2012 | Byun et al. |
| 2012/0120327 A1 | 5/2012 | Marx et al. |
| 2012/0147055 A1 | 6/2012 | Pallakoff et al. |
| 2012/0223943 A1 | 9/2012 | Williams et al. |
| 2012/0228240 A1 | 9/2012 | Gentile et al. |
| 2012/0245969 A1 | 9/2012 | Campbell |
| 2012/0246023 A1 | 9/2012 | Starr |
| 2012/0273442 A1 | 11/2012 | Hardy |
| 2012/0280810 A1 | 11/2012 | Wheeler |

(56) References Cited

U.S. PATENT DOCUMENTS

| | | |
|---|---|---|
| 2012/0284085 A1 | 11/2012 | Walker et al. |
| 2012/0284132 A1 | 11/2012 | Kim et al. |
| 2012/0286937 A1 | 11/2012 | Cote et al. |
| 2012/0330781 A1 | 12/2012 | Borrero |
| 2013/0002422 A1 | 1/2013 | Wiese et al. |
| 2013/0024023 A1 | 1/2013 | Siegel et al. |
| 2013/0030953 A1 | 1/2013 | Marsic |
| 2013/0037562 A1 | 2/2013 | Close |
| 2013/0109323 A1 | 5/2013 | Ruutu et al. |
| 2013/0132216 A1 | 5/2013 | Aihara et al. |
| 2013/0157569 A1 | 6/2013 | Torvmark et al. |
| 2013/0210360 A1 | 8/2013 | Ljung et al. |
| 2013/0214909 A1 | 8/2013 | Meijers et al. |
| 2013/0226742 A1 | 8/2013 | Johnson et al. |
| 2013/0235206 A1 | 9/2013 | Smith et al. |
| 2013/0275261 A1 | 10/2013 | Yoked |
| 2013/0317903 A1 | 11/2013 | Majrani |
| 2013/0332271 A1 | 12/2013 | Hay |
| 2014/0006225 A1 | 1/2014 | Bowman et al. |
| 2014/0006229 A1 | 1/2014 | Birch et al. |
| 2014/0043162 A1 | 2/2014 | Siciliano et al. |
| 2014/0055243 A1 | 2/2014 | Kerai |
| 2014/0100769 A1 | 4/2014 | Wurman et al. |
| 2014/0100999 A1 | 4/2014 | Mountz et al. |
| 2014/0110584 A1 | 4/2014 | Campbell |
| 2014/0113560 A1 | 4/2014 | Graube et al. |
| 2014/0139548 A1 | 5/2014 | Byers |
| 2014/0145828 A1 | 5/2014 | Bassan-Eskenazi et al. |
| 2014/0197953 A1 | 7/2014 | Valiulis et al. |
| 2014/0201042 A1 | 7/2014 | Meyer |
| 2014/0210692 A1 | 7/2014 | Waters et al. |
| 2014/0214195 A1 | 7/2014 | Worsley |
| 2014/0220883 A1 | 8/2014 | Emigh et al. |
| 2014/0239061 A1 | 8/2014 | Smith et al. |
| 2014/0247116 A1 | 9/2014 | Davidson |
| 2014/0258028 A1 | 9/2014 | Bynum et al. |
| 2014/0268949 A1 | 9/2014 | Kayser |
| 2014/0291405 A1 | 10/2014 | Harkes |
| 2014/0299620 A1 | 10/2014 | Swafford, Jr. et al. |
| 2014/0305891 A1 | 10/2014 | Vogler et al. |
| 2014/0352372 A1 | 12/2014 | Grant et al. |
| 2014/0360953 A1 | 12/2014 | Pichel |
| 2015/0088306 A1 | 3/2015 | Varrasso |
| 2015/0090675 A1 | 4/2015 | Vosshenrich |
| 2015/0382150 A1 | 12/2015 | Ansermet et al. |
| 2016/0132822 A1 | 5/2016 | Swafford |

FOREIGN PATENT DOCUMENTS

| | | |
|---|---|---|
| CH | 223095 A | 8/1942 |
| CH | 412251 A | 4/1966 |
| CN | 1972228 A | 5/2007 |
| CN | 101472509 A | 7/2009 |
| DE | 969003 C | 4/1958 |
| DE | 1819158 U | 10/1960 |
| DE | 2002720 A1 | 7/1971 |
| DE | 7311113 U | 8/1973 |
| DE | 2232398 A1 | 1/1974 |
| DE | 2825724 A1 | 12/1979 |
| DE | 3116145 A1 | 11/1982 |
| DE | 8308485 U1 | 9/1983 |
| DE | 3211880 A1 | 10/1983 |
| DE | 8426651 U1 | 2/1985 |
| DE | 8520125 U1 | 1/1986 |
| DE | 3628609 A1 | 2/1988 |
| DE | 19745813 A1 | 4/1999 |
| DE | 299026888 | 7/1999 |
| DE | 102004037365 A1 | 3/2006 |
| EP | 0004921 A1 | 10/1979 |
| EP | 0018003 A2 | 10/1980 |
| EP | 0048479 A1 | 3/1982 |
| EP | 0176209 A2 | 4/1986 |
| EP | 0224107 A2 | 6/1987 |
| EP | 270016 A2 | 6/1988 |
| EP | 298500 A2 | 1/1989 |
| EP | 0337340 A2 | 10/1989 |
| EP | 0408400 A1 | 1/1991 |
| EP | 0454586 A1 | 10/1991 |
| EP | 0572119 A2 | 12/1993 |
| EP | 0587059 A2 | 3/1994 |
| EP | 0806749 A1 | 11/1997 |
| EP | 986980 A1 | 3/2000 |
| EP | 0779047 B1 | 4/2000 |
| EP | 1057164 A1 | 12/2000 |
| EP | 1249804 A2 | 10/2002 |
| EP | 1356425 A1 | 10/2003 |
| EP | 1395152 A1 | 3/2004 |
| EP | 2309377 A1 | 4/2011 |
| EP | 2367101 A1 | 9/2011 |
| FR | 2385365 A1 | 10/1978 |
| FR | 2526338 A1 | 11/1983 |
| FR | 2617385 A1 | 1/1989 |
| FR | 2859364 A1 | 3/2005 |
| GB | 697994 A | 10/1953 |
| GB | 740311 A | 11/1955 |
| GB | 881700 A | 11/1961 |
| GB | 1082150 A | 9/1967 |
| GB | 1088654 A | 10/1967 |
| GB | 2027339 B | 8/1982 |
| GB | 2180527 A | 4/1987 |
| GB | 2 232 398 A | 12/1990 |
| GB | D2037553 | 7/1994 |
| GB | 2281289 A | 3/1995 |
| GB | 2290077 A | 12/1995 |
| GB | 2297241 A | 7/1996 |
| GB | 2283407 B | 10/1997 |
| GB | 2392667 A | 3/2004 |
| GB | 2480462 A | 11/2011 |
| JP | 54168195 | 11/1979 |
| JP | 59218113 | 8/1984 |
| JP | 62060521 A | 3/1987 |
| JP | 6329463 | 2/1988 |
| JP | 6056224 | 3/1994 |
| JP | 6209945 | 7/1994 |
| JP | 7257714 | 9/1994 |
| JP | H11342054 A | 12/1999 |
| JP | 2007525393 A | 9/2007 |
| JP | 2007-284238 A | 11/2007 |
| KR | 1020040089123 A | 10/2004 |
| KR | 1020060123497 | 6/2008 |
| KR | 1020090054501 | 12/2010 |
| KR | 1020100022890 | 8/2011 |
| KR | 1020100041969 | 11/2011 |
| NL | 106617 A | 11/1963 |
| RU | 2101731 C1 | 1/1998 |
| SE | 394537 B | 6/1977 |
| SU | 1600615 A3 | 10/1990 |
| WO | 91/15141 A1 | 10/1991 |
| WO | 9311449 A1 | 6/1993 |
| WO | 0061438 A1 | 10/2000 |
| WO | 0071004 A1 | 11/2000 |
| WO | 02/091885 A1 | 11/2002 |
| WO | 03016938 A2 | 2/2003 |
| WO | 2003032775 | 4/2003 |
| WO | 03039301 A1 | 5/2003 |
| WO | 2004104951 A1 | 12/2004 |
| WO | 2005057444 A1 | 6/2005 |
| WO | 2006023954 A2 | 3/2006 |
| WO | 06133487 A1 | 12/2006 |
| WO | 2007024639 A2 | 3/2007 |
| WO | 2007073334 A1 | 6/2007 |
| WO | 07140800 A1 | 12/2007 |
| WO | 2007149967 A2 | 12/2007 |
| WO | 10082835 A1 | 7/2010 |
| WO | 10137883 A2 | 12/2010 |
| WO | 11001024 | 1/2011 |
| WO | 2011089452 A1 | 7/2011 |
| WO | 2012166613 A1 | 12/2012 |
| WO | 14080252 A1 | 5/2014 |

OTHER PUBLICATIONS

Apr. 6, 2018—(KR) Office Action—App 10-2017-7015819.
Jan. 18, 2018—(AU) Examination Report—App 2015346254.

(56) References Cited

OTHER PUBLICATIONS

Apr. 2, 2018—(CN) First Office Action—App 201480024831.0.
Jul. 6, 2018—(CN) Third Office Action—App 201480026575.9.
Feb. 23, 2018—(CN) Second Office Action—App. No. 201480026575.9.
May 30, 2018—(AU) Examination Report—App 2015346254.
Nov. 7, 2017—(EP) Extended Search Report—App. No. 17177125.6.
Nov. 7, 2017—(EP)—Communication 94(3) EPC—App 14716461.0.
Jul. 18, 2017—(KR) Office Action—App. 10-2015-7029832.
Jun. 7, 2017—(CN) ISR—App. No. 201480026575.9.
Jun. 19, 2017—(CN) First Office Action and ISR—App. No. 201480026575.9.
Apr. 6, 2015—(WO) ISR—App. No. PCT/US2014/29124.
Dec. 14, 2015—(EP) Examination Report—App 11745636.
Mar. 20, 2008—(WO) ISR and Written Opinion—App. No. PCT/US05/02836.
Jan. 28, 2011—(EP) Supplementary Search Report—App. No. 05712322.6-2221.
Dec. 6, 2011—(EP) Office Action—App. No. 05712322.6-2221.
May 25, 2011—(EP) Office Action—App. No. 05712322.6-2221.
Nov. 24, 2011—(WO) ISR and Written Opinion—App. No. PCT/US2011/046209.
Feb. 21, 2013—(WO) IPR and Written Opinion—App. No. PCT/US2011/046209.
Apr. 2, 2014—(RU) Office Action—App. No. 2013109955.
Sep. 24, 2015—(WO) IPRP and Written Opinion—App. No. PCT/US2014/29124.
Apr. 6, 2015—(WO) Written Opinion—App. No. PCT/US2014/29124.
Mar. 1, 2017—(AU) Second Office Action—App. No. 2014228923.
Aug. 19, 2016—(EP) Extended ESR—App. No. 14723571.7-1903.
Shelf-edge digital price tags invade the South of France http://www.digitalsignagetoday.com/article/196299/Shelf-edge-digital-price-tags-invade-the-South-of-France.
eSignage http://www.episys.com/page/25/esignage.htm.
Electronic Shelf-Edge Labels ("Realprice system") http://www.hitech-lcd.com/ESL.html.
Segmented Dot Matrix Electronic Shelf Label – SM Model and Segmented Dot Matrix Electronic Narrow Facing Label – MM http://www.ilid.com.au/product-range.php#sm.
Electronic Shelf-Edge Labels http://www.fujitsu.com/downloads/EU/uk/pdf/industries/retail/retail-solutions-electronic-self-edge-labels.pdf.
The NZ ESL range from pricer http://www.electronicshelflabelling.co.nz/products/.
Retailer introduces electronic shelf-edge labelling http://www.conveniencestore.co.uk/news/retailer-introduces-electronic-shelf-edge-labelling/231511.article.
Revolutionary Shelf Edge Displays from in the UK http://crystal-display.com/digital-signage/shelf-edge-displays/.
XDS-1068: 10-inch All-in-One Multi-touch Signboard with Power-over-Ethernet http://www.iadea.com/products/xds-1068.
ZBD Solutions, Shelf Edge Labelling http://www.zbdsolutions.com/solutions/index.html (printed Jan. 29, 2013).
Vectron, Speedy POS Solutions to make ezi-profits. 15 pages.
"How physics drives the supermarket industry," IOP Institute of Physics, Physicsworks. 4 pages.
John Ross, "Retail technology and the evolving shopper," Shopper Sciences. 11 pages.
Altierre Digital Retail, Altierre Corp., "Altierre Unveils E-Paper Product Family for Digital Signs and Price Tags." 2 pages, http://www.altierre.com/pr_e-paper.html (printed Jan. 31, 2013).
Apr. 2, 2014—(RU)—Office Action—App 2013109955.
Oct. 27, 2016—(KR) Final Rejection—App 10-2015-7027591.
FFr Yello pp. 02003 Product Catalog, "Merchandising Ideas Made Easy for Every Retail Environment!", Cover p. 9-11, 48-49, 52-58, Back Cover.
Letter from Maria Comninou of Harness Dickey to Stephanie Knapp dated Nov. 11, 2009.
Document entitled "Relevant Prior Art for U.S. Appl. No. 10/772,010".
Suzanne Vita Palazzo, "New life for ESLs?, Advanced capabilities being built into electronic shelf labels may help overcome retailers' concerns about ROI.", Grocery Headquarters (www.groceryheadquarters.com), Mar. 2007, pp. 97-100.
Scott D. Walkins & Megan E. Henriksen of Anderson Economic Group, LLC, "Michigan's Item Pricing Law: The Price Tag for Retailers and Consumers," Dec. 11, 2010 (http://www.AndersonEiectronicGroup.com) 39 pages.
"Product Range :: I LID—The next generation in electronic shelf labels," : http://www.ilid.com.au/product-range.php, printed on Mar. 5, 2013, dale of website unknown but prior to the filing of the present matter.
"Electronic Shelf Label controlling various information in real lime (ESL)," hllp:l/cesl.co.kr/eng/product-inlroduction/cest-esl.hlml, CEST—Center for Embedded Software Technology, printed on Mar. 5, 2013, dale of website unknown but prior to the filing of the present matter.
Jun. 24, 2014—(MX)—Office Action—App MX/a/2013/001455—Eng Tran.
Mar. 3, 2015—(AU) Office Action—App 2011285929.
Mar. 3, 2015—(AU) Office Action—App 2013205058.
Apr. 6, 2015—(PCT) International Search Report—App PCT/US14/29124.
Dec. 14, 2015—(EP) Exam Report—App 11745636.8.
Apr. 19, 2016—(KR) Office Action—App 10-2015-7027591.
Apr. 22, 2016—(PCT)—International Search Report—App PCT/US2015/060404.
Apr. 22, 2016 (PCT) ISR and Written Opinion—App PCT/US2015/060404.
Jun. 22, 2016—(AU) Search Report—App 2014225837.
Jun. 28, 2016—(AU) Examination Report—App 2014228923.
Aug. 18, 2016—(EP) Office Action—App 14716461.0.
Jun. 10, 2014—(PCT) ISR & Written Opinion—App PCT/US2014/020797.
Sep. 19, 2016—(PCT) International Search Report—App PCT/US2016/032328.
Robertson, "Food Packaging: Principles and Practice, Second Edition", CRC Press, XP055301114, 978-0-8493-3775-8, vol. 0, p. 308, dated Sep. 22, 2005.
George Coulouris et al., "Distributed Systems: Concepts and Design (5th Edition)", Addison-Wesley, US, XP055261658, ISBN: 978-0-13-214301-1 pp. Ch01-Ch06, Ch09-Ch10, ch13,, Chapters 1, 3 and 19, dated May 7, 2011.
Oct. 28, 2018—(KR) Final Rejection—App 10-2017-7015819.

\* cited by examiner

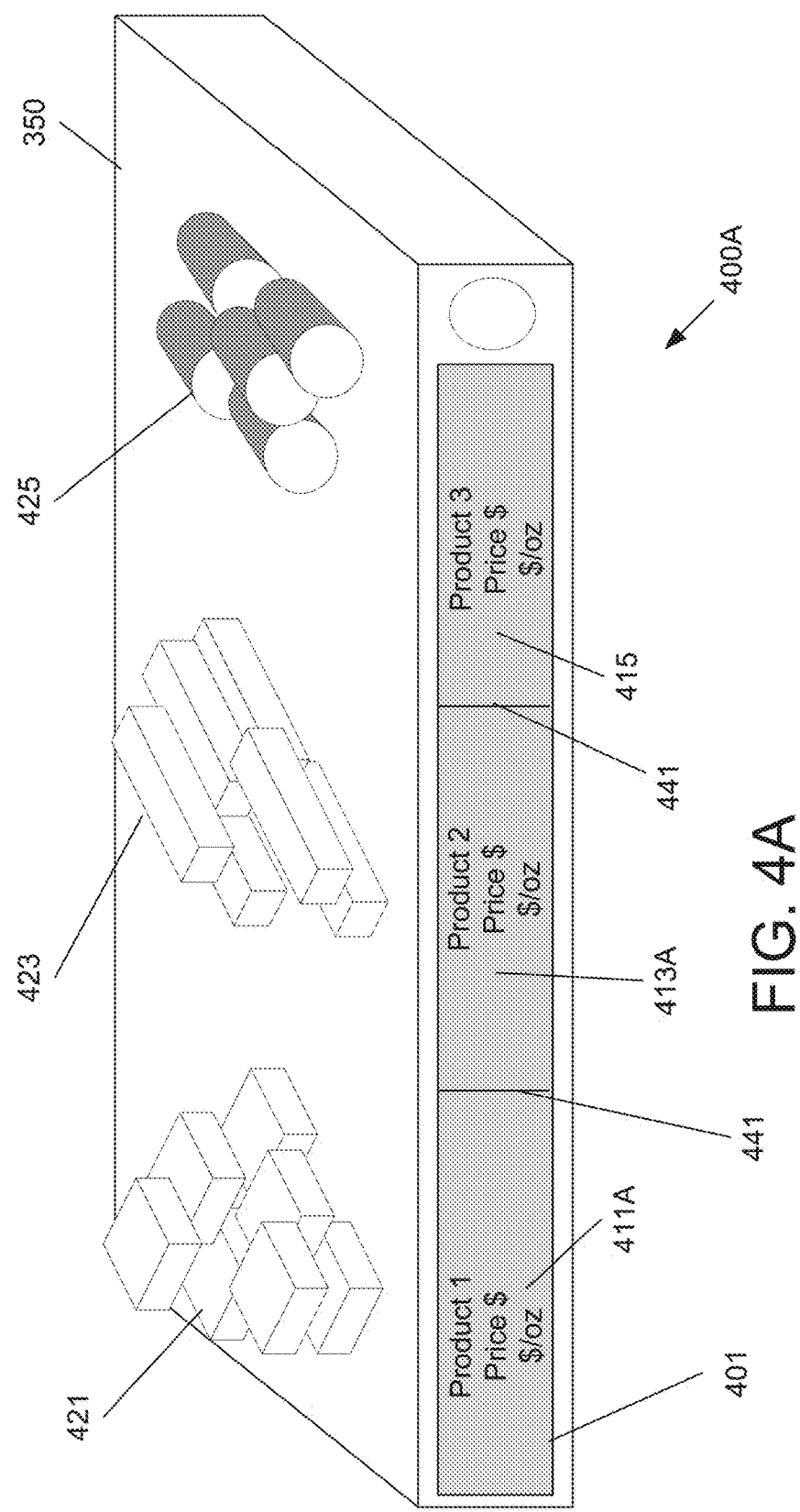

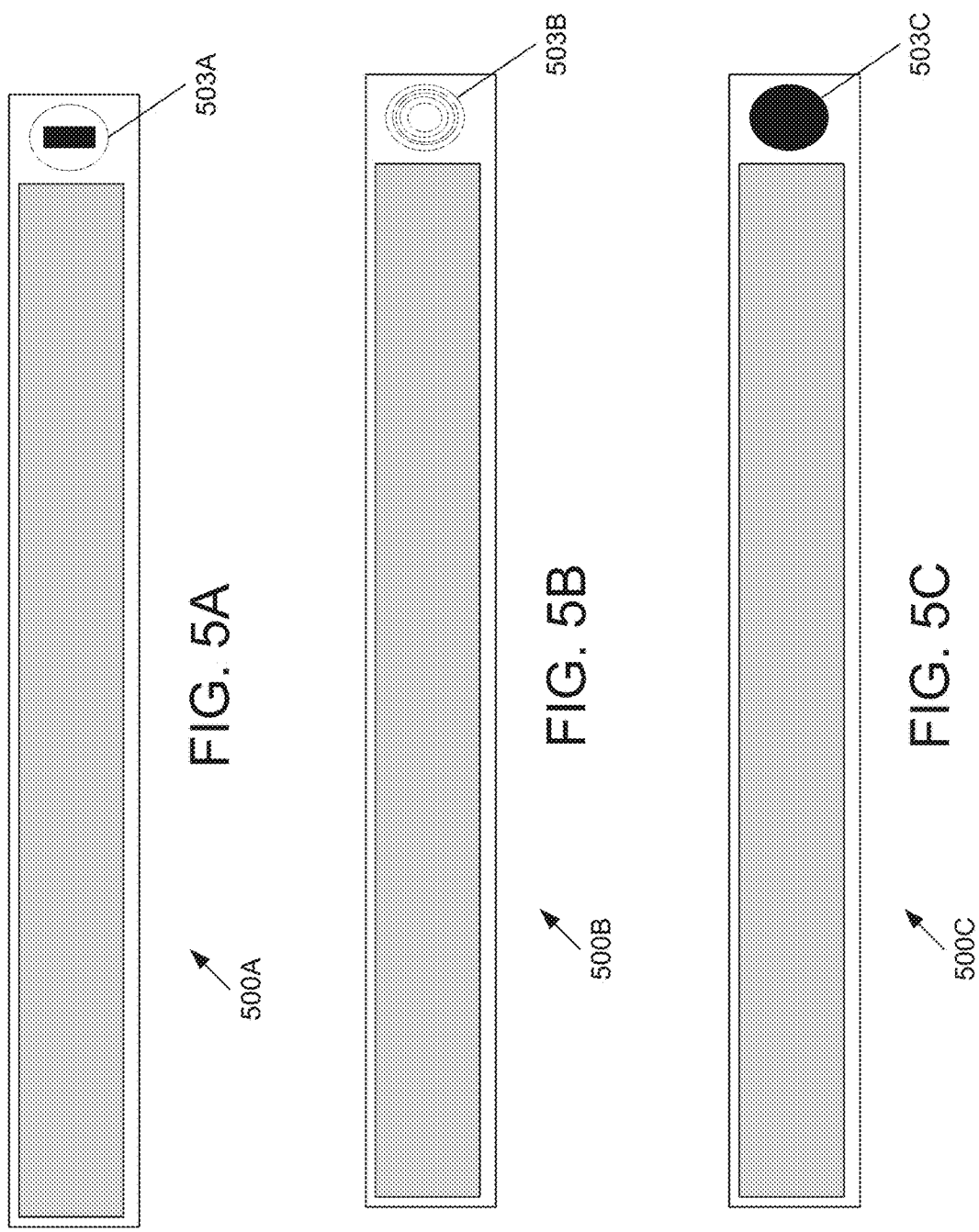

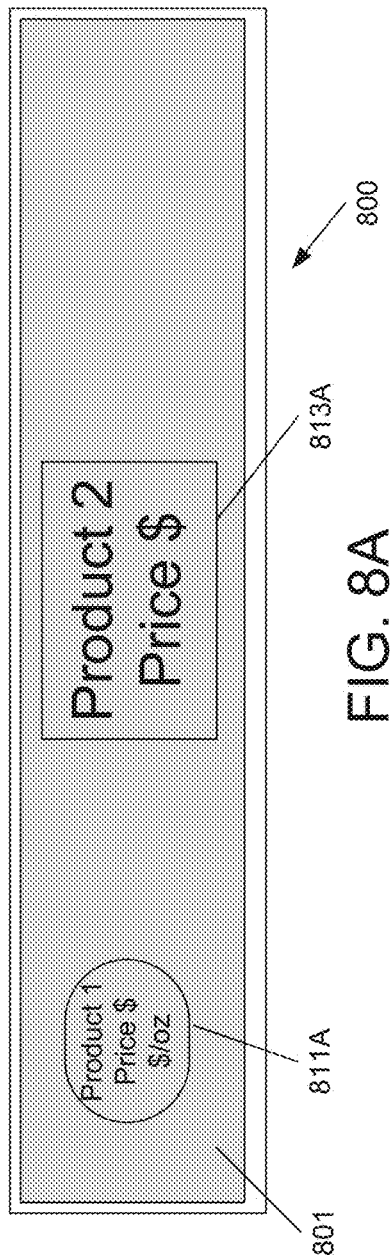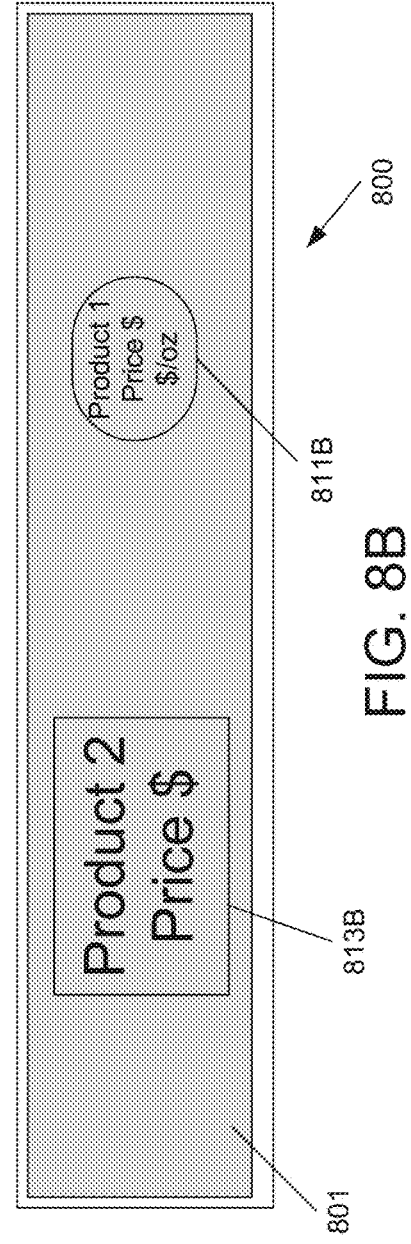

CONTINUOUS DISPLAY SHELF EDGE LABEL DEVICE

CROSS REFERENCE TO RELATED APPLICATIONS

This application is a continuation of U.S. application Ser. No. 13/836,680, filed Mar. 15, 2013, which is a continuation-in-part of U.S. application Ser. No. 13/194,649, filed Jul. 29, 2011, now U.S. Pat. No. 8,812,378, which is a continuation of U.S. application Ser. No. 12/876,919, filed Sep. 7, 2010, now U.S. Pat. No. 8,938,396, which is a continuation-in-part of U.S. application Ser. No. 10/772,010, filed Feb. 3, 2004, now U.S. Pat. No. 7,792,711. This application also claims priority to U.S. Provisional Application Ser. No. 61/371,417, filed Aug. 6, 2010. This application also claims priority to U.S. application Ser. No. 13/836,680 which is a continuation-in-part of U.S. application Ser. No. 13/785,082, filed Mar. 5, 2013, now U.S. Pat. No. 9,818,148, entitled In-Store Item Alert Architecture. The contents of each of these applications are incorporated herein by reference in their entirety.

BACKGROUND

Retail businesses often are tasked with rapid changes in customer product interests and in implemented internal changes to handle the same. As new products become increasingly popular among customers, retailers are tasked with changing shelf edge labels of products in order to attract customers to other products, market specific products, or to update product information, such as pricing, as quickly as possible.

Electronic shelf edge label devices allow retailers to manually swap out one device representing one single product for another device representing another single product or even changing a device to provide different information on a single product or to change from outputting data on one single product for data on another single product. However, further improvements and innovations in the area of convenience for a retailer are desired.

SUMMARY

A method and apparatus for providing information along a shelf edge of a retailer is described. On a display configured to be oriented along an edge of a shelf of a retailer, a first user interface including first information about a first product on the shelf is provided. At least one second user interface including at least one second information about at least one second product on the shelf is provided on the display. An individual is permitted to edit a parameter of the first user interface and/or the at least one second user interface. The parameter may include at least one of: a size of the user interface on the display, a shape of the user interface on the display, and a location of the user interface on the display. The first information and the at least one second information may be outputted concurrently to the display.

BRIEF DESCRIPTION OF THE DRAWINGS

Some features herein are illustrated by way of example, and not by way of limitation, in the figures of the accompanying drawings and in which like reference numerals refer to similar elements.

FIGS. 4A-4B illustrate an example of a changing continuous display according to one or more illustrative aspects of the disclosure.

FIGS. 5A-5C illustrate example continuous displays with locking mechanism according to one or more illustrative aspects of the disclosure.

FIGS. 8A-8B illustrate an example of a changing location of user interfaces according to one or more illustrative aspects of the disclosure.

DETAILED DESCRIPTION

Figure 1:
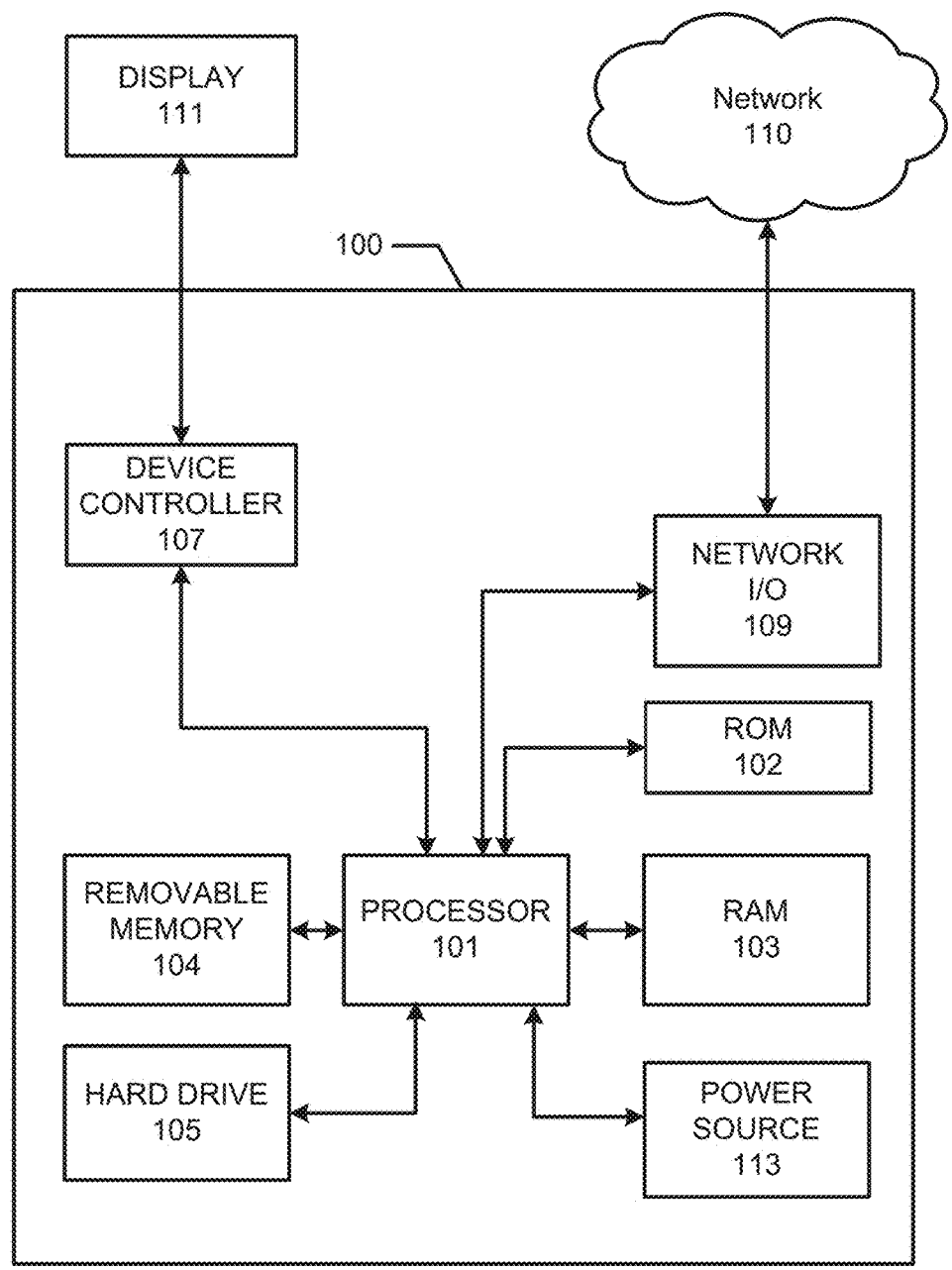
FIG. 1 illustrates an example block diagram of an apparatus for communicating and distributing content according to one or more illustrative aspects of the disclosure.

FIG. 1 illustrates an example block diagram of an apparatus for communicating and distributing content according to one or more illustrative aspects of the disclosure. Network 110 may include networks of one or more access points, Internet devices, telephone networks, cellular telephone networks, fiber optic networks, local wireless networks (e.g., WiMAX), satellite networks, and any other desired network. The network 110 may include and/or function as a cloud computing infrastructure comprising various processing and/or memory devices (e.g., servers, databases, application providers, etc.).

The various devices described herein, such as a continuous display shelf edge label device, a server, a scanner, a database, a computer, and the like may be computing devices, and FIG. 1 illustrates general hardware elements that can be used to implement any of the various computing devices discussed herein. The computing device 100 may include one or more processors 101, which may execute instructions of a computer program to perform any of the features described herein. Processor 101 may comprise a customized digital integrated circuit such as an ASIC. However, in some applications, commercially available processors may be employed. The instructions may be stored in any type of non-transitory computer-readable medium or memory, to configure the operation of the processor 101. For example, instructions may be stored in a read-only memory (ROM) 102, random access memory (RAM) 103, hard drive 105, removable media 104, such as a Universal Serial Bus (USB) drive, compact disk (CD) or digital versatile disk (DVD), floppy disk drive, or any other desired electronic storage medium. Instructions may also be stored in an attached (or internal) hard drive 105. One or more of the memories 102, 103, 104, and/or 105 may include a more advanced operation environment such as an operating system for advanced functionality and adaptability.

One or more memories 102, 103, 104, and/or 105 may include a stored address location and display data location data. Address location may include an address that identifies the computing device 100. The address may uniquely identify the computing device 100. Display data location data may be used by processor 101 to format data to be displayed on display 111. This may include text data, graphics, dynamic content, and combinations. In accordance with at least one embodiment, the display data location data in a memory may is in accordance with a mark-up language such as HTML, XML, or the like. Although shown in FIG. 1 as being outside of computing device 100, display 111 also may be integrated into a same physical housing and/or structure as computing device 100. One or more components shown within computing device 100 similarly may be housed separately in another device and/or in another location from computing device 100.

The computing device 100 may include one or more output devices, such as a display 111, and may include one or more output device controllers 107, such as a video processor. There may also be one or more user input devices (not shown), such as a remote control, keyboard, mouse, touch screen, microphone, etc. In another embodiment, input/output functions with a user may occur through display 111 where display 111 may be configured to allow for touch screen input in order to see additional output on the display 111. As shown illustratively in the examples of FIGS. 3-8B, display 111 may be configured to be oriented along an entire edge of a shelf of a retailer. This area of a shelf often includes paper labels that identify the product being sold above it and possibly additional information, such as price, cost/oz., and the like. Electronic shelf labels allow for a similar concept as a paper label, but with an individual computing device with a display screen for each product. Such electronic shelf label devices provide information regarding the single product being sold above it and possibly additional information, such as price, cost/oz., and the like and may include additional output such as video. However, display 111 of FIG. 1 is configured to output at least two user interfaces that correlate to two different products that a retailer may be offering for sale.

Display 111, in operation with device controller 107 and/or processor 101, may be configured to receive swipes across its surface by an individual's finger. The swipes of a finger may be correlated to an operational table for an action to be taken with respect to outputted user interface data. Display 111, in operation with device controller 107 and/or processor 101, may be configured to translate one or more finger swipes across its surface as one or more particular actions to be taken as described herein. Illustrative examples may include interpreting a movement of two fingers on the surface being moved away from each other as an expansion instruction, e.g., an input by an individual to expand the size of something, such as text size of the user interface, border design size of the user interface, frame size of the user interface, and the like. Other examples include interpreting the creation of an "X" by two finger movements over top of a user interface as a deletion instruction, e.g., an input by an individual to delete a user interface. Still other examples include interpreting a press and hold and movement of a finger from one area of the display to another area of the display as a movement instruction, e.g., an input by an individual to move a user interface from a current location on the display to another location on the display. Yet other illustrative examples include interpreting a double tap on the display surface by two finger taps as an addition instruction, e.g., an input by an individual to add a user interface to that area of the display that was tapped. Still further illustrative examples include interpreting a movement of two fingers on the surface being toward each other as a reduction instruction, e.g., an input by an individual to reduce the size of something, such as text size of the user interface, border design size of the user interface, frame size of the user interface, and the like. The examples described herein are merely illustrative and any of a number of additional input movements/taps across the surface of display 111 may be included herein for any of a number of other types of instructional requests by an individual to change a parameter of a user interface on display 111.

In other embodiments, display 111 may be configured to identify movements of a stylus or other pointing device against its surface in a similar manner as described herein with respect to an individual's fingers. A user and display 111 could interact with a stylus as the source of input by the user. As far as potential authorization of the individual, some manner of identification/authorization may be built into the stylus such that, if in contact with the display 111, the stylus could act as the mechanism for authenticating the individual to make changes to one or more parameters of the continuous display shelf edge label device as described herein. In still further embodiments, display 111 may be configured to identify movements of an individual's finger against its surface for entry of user interface information directly. A user could handwrite pricing information and/or other information about a particular product with her finger on display 111. Software may be included in a memory of the computing device to translate received finger swipes as corresponding to pricing information, product name information, and/or other product data information. In such examples, a worker can merely write in the current pricing for a product.

Similarly, display 111 may be configured to activate an electronic keyboard on screen and/or an electronic keypad. A digital alphanumeric user interface may be displayed on display 111 to allow an authorized individual to enter product information data and/or modify a user interface on display 111 in some other manner. For example, a worker could enter a pricing for a particular product by entering a number sequence on a displayed digital keypad. An entry of "$" character followed by "1", ".", "4", "9" may be translated by software within a memory of a computing device associated with display 111 as entry of a pricing label of $1.49 for a user interface for a particular product. In other scenarios, a worker may use alphanumeric characters to type in text for display in a user interface of a product, such as "On Sale Now!" In still other scenarios, special digital input options may be made available to an authorized individual for quick entry. A favorites list may prompt a worker to choose from a list where one entry may be "On Sale Now," a second entry may be "Sale Ends Tomorrow," while another entry may be "Buy 1, Get 1 Free!"

Figure 2A:
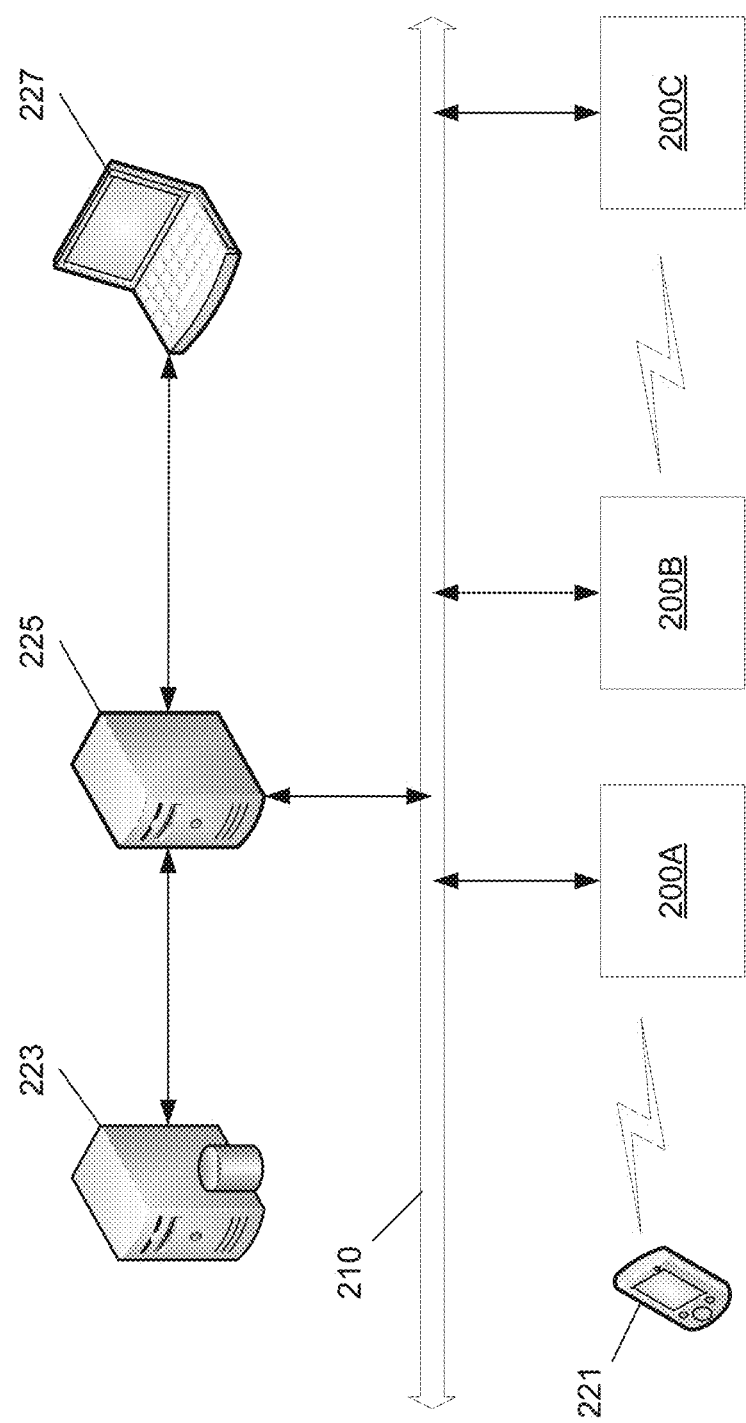
FIGS. 2A-2B illustrates example block diagrams of systems for communicating and distributing content according to one or more illustrative aspects of the disclosure.

In yet other embodiments, an authorized individual may access display 111 in order to access data for a user interface from a remote location. In the example of FIG. 2A where data about products may be maintained in database 223, a worker could access display 111 about a particular user interface for a product. The worker could access the database through a visual file/folder system. Each component of a network system implementing the disclosure as described herein may be accessible through a continuous display shelf edge label device and may appear as some type of visual indicator on display 111. A worker could search and find the applicable component for the requested data (such as find an icon corresponding to the database 223) and access that component (launch the icon) to obtain the desired data. Any of a number of additional entry mechanisms may be utilized and the examples described herein are merely illustrative.

In additional embodiments, display 111 may be configured to include gesture-based interface capabilities as one manner to allow an authorized individual to edit/manipulate the user interfaces on the display 111. Display 111 may include appropriate hardware and/or software components to interpret gestures of an individual, whether a finger, a hand, and/or some other portion, via mathematical algorithms. These gestures may include one or more of the finger to surface examples described herein. In some of these embodiments, one or more cameras may be associated with and/or included with display 111 for capture of imaging and recognition of gestures. Although the majority of examples herein are for an individual interfacing with a display with her finger, it should be understood that such examples may be implemented similarly by way of gesture based technologies as described herein.

The computing device 100 may also include one or more network interfaces, such as input/output circuits 109 (such as a network interface circuit, a scanner interface circuit, and the like) to communicate with an external network 110. The input/output circuits 109 may be a wired interface, wireless interface, or a combination of the two. The input/output circuits 109 allows for communication between two computing devices, such as a continuous display shelf edge label devices and a scanner, e.g., 200 and 221 in FIG. 2 described herein, a continuous display shelf edge label devices and a remote user terminal, e.g., 200 and 227 in FIG. 2 described herein, and/or a continuous display shelf edge label devices and a database, e.g., 200 and 223 in FIG. 2 described herein.

Computing device 100 also may include a power source 113. Power source 113 allows for the computing device to operate the processor 101 and various other components. Power source 113 may include a dedicated battery source or external power source, such as an AC source connection. In other embodiments, power source 113 may be configured to operate by harvesting energy for operation from ambient light in a store where the computing device is located. Light energy may be captured by a variety of means for conversion, such as by photo sensors, solar photovoltaic panels, and photo diodes. Because the computing device 100 may operate without an external source connection, movement of the computing device from one physical location to another physical location can be accomplished without the need to reconnect to another external source. Further, because the computing device 100 may operate without an internal battery, the computing device does not need to be checked to ensure operation nor need to have a technician replace the internal battery.

Figure 2B:
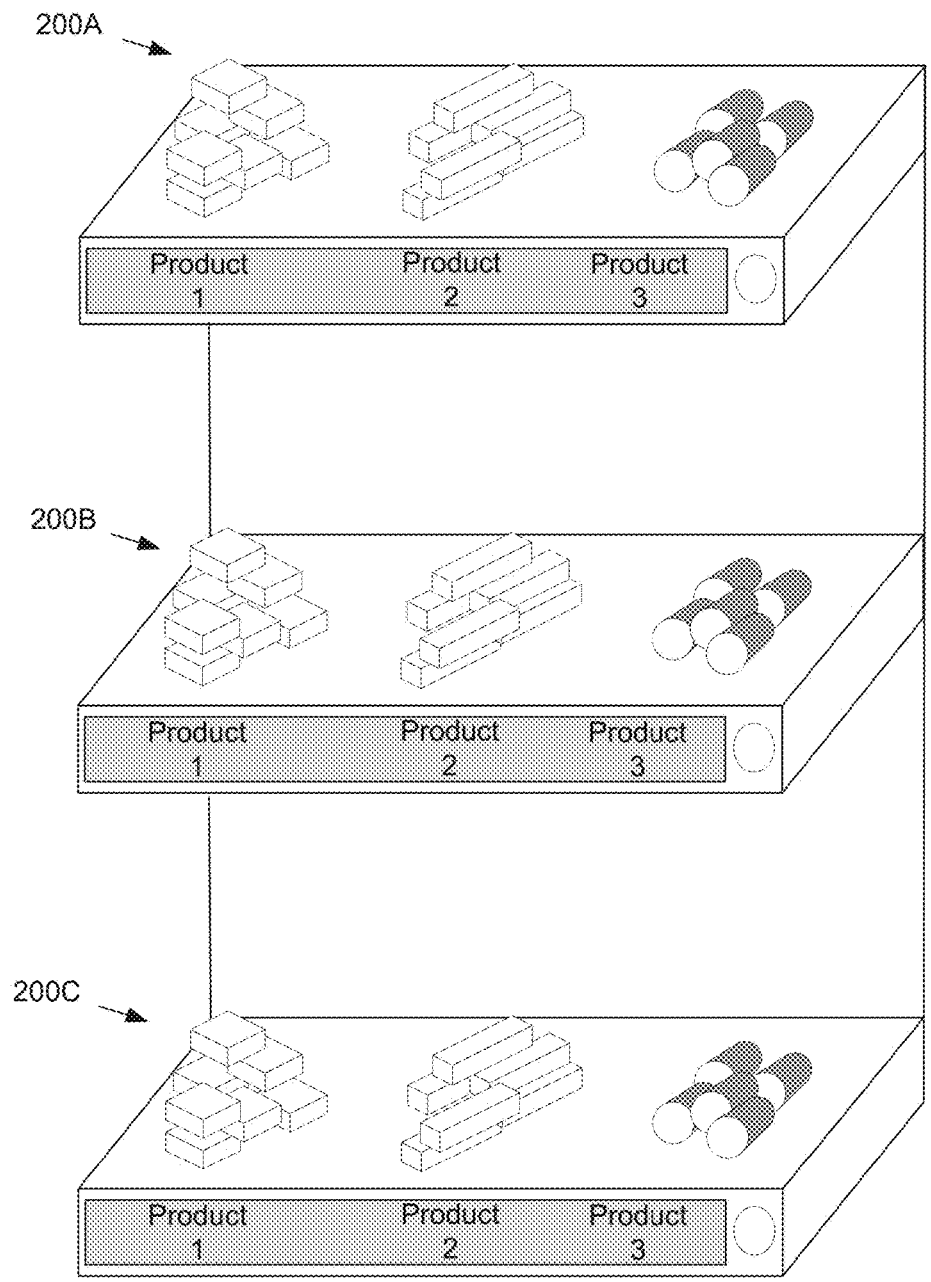

FIGS. 2A-2B illustrate example block diagrams of systems for communicating and distributing content according to one or more illustrative aspects of the disclosure. In the example of FIG. 2A, a plurality of computing devices, are shown operatively connected to a network 210. Network 210 may include network 110. Connected to network 210 are shown three continuous display shelf edge label devices 200A-200C. Continuous display shelf edge label devices 200A-200C may be computing device 100 and/or may include one or more of the components described therein. The three continuous display shelf edge label devices 200A-200C may be along an aisle of a retailer's store. The three continuous display shelf edge label devices 200A-200C may be positioned above each other as illustratively depicted in FIG. 2B.

Continuous display shelf edge label device 200A is shown as being in communication with a scanner 221. Although illustratively shown as a wireless communication, the transmission path between continuous display shelf edge label device 200A and scanner 221 may be a wired communication path, through network 210, and/or in some other manner. Scanner 221 may interact with continuous display shelf edge label device 200A through a communication interface, such as input/output circuits 109. Continuous display shelf edge label device 200A may be configured to receive data representative of information about a product on a shelf where the continuous display shelf edge label device 200A is located. An authorized individual, such as a worker for the retailer, may desire to update pricing data currently being displayed about a product on the shelf. By interfacing with the scanner 221, the price data for a particular product may be received electronically by the continuous display shelf edge label device 200A. Illustrative manners for transmission of such data include coding data for wireless transmission and forwarding the data wirelessly to the continuous display shelf edge label device 200A. In one example, an individual may type in a price at scanner 221 and data representative of the price may be sent wirelessly to the continuous display shelf edge label device 200A. The continuous display shelf edge label device 200A may then update a user interface for a product corresponding to the price data as described herein.

Continuous display shelf edge label devices 200B and 200C are shown as being in communication with each other. Although illustratively shown as a wireless communication, the transmission path between continuous display shelf edge label devices 200B and 200C may be a wired communication path, through network 210, and/or in some other manner. Continuous display shelf edge label device 200B may interact with continuous display shelf edge label device 200C through a communication interface, such as input/output circuits 109. Continuous display shelf edge label device 200B may be configured to receive data representative of information about a product on a shelf where the continuous display shelf edge label device 200B is located. An authorized individual, such as a worker for the retailer, may desire to update pricing data currently being displayed about a product on the shelf. By interfacing with the continuous display shelf edge label device 200C, the price data for a particular product may be received electronically by the continuous display shelf edge label device 200B. Such an interface may be the worker swiping her finger across the display surface of the continuous display shelf edge label device 200C to initiate a movement instruction to have a user interface from continuous display shelf edge label device 200C be transferred to continuous display shelf edge label device 200B. In one example, the worker may press and hold a user interface on continuous display shelf edge label device 200C and move her finger up quickly in a flicking motion.

Such a motion may be interpreted by the system to transfer the flicked user interface to the next shelf edge up. As such, because continuous display shelf edge label device 200B is on the next shelf edge above continuous display shelf edge label device 200C, the flicked user interface can be added to the continuous display shelf edge label device 200B. Illustrative manners for transmission of such data include coding data for wired transmission and forwarding the data to the continuous display shelf edge label device 200B.

Aspects of the interaction between a worker located near a shelf with a scanner 221 may be similarly implemented between a worker located remote from such a shelf. User terminal device 227 is shown operatively connected to continuous display shelf edge label devices 200A-200C through network 210 and a main hub 225. Main hub 225 may be some type of central processing server configured to accommodate transmission of communications between various backend components of a retailer's network, such as user terminals 227 and a database 223 and from a backend to a storefront end, such as to continuous display shelf edge label devices 200A-200C through network 210. Main hub 225, user terminal 227, and/or database 223 may include one or more components of the computing device 100 illustrated in FIG. 1.

A worker at user terminal 227 may update pricing data, and/or other data, about a particular product on a particular shelf by accessing the continuous display shelf edge label device associated with that product. User terminal 227 may access database 223 for current product information for potential display and/or scheduled display. Instructions may be sent from user terminal 227 on such product information to the appropriate continuous display shelf edge label device. In another example, continuous display shelf edge label devices 200A-200C may access database 223 to obtain current product information data for respective user interfaces on the continuous display shelf edge label devices. In one such example, database 223 may be periodically updating with pricing changes, such as by a worker through user terminal 227. Continuous display shelf edge label devices 200A-200C may periodically poll the database 223 to obtain current product information data and change user interfaces being displayed as needed. In still other embodiments, database 223, main hub 225, and/or user terminal 227 periodically may push current product information data to continuous display shelf edge label devices 200A-200C, either globally or specifically. The continuous display shelf edge label devices 200A-200C may receive such data and change user interfaces being displayed as needed.

Figure 3:
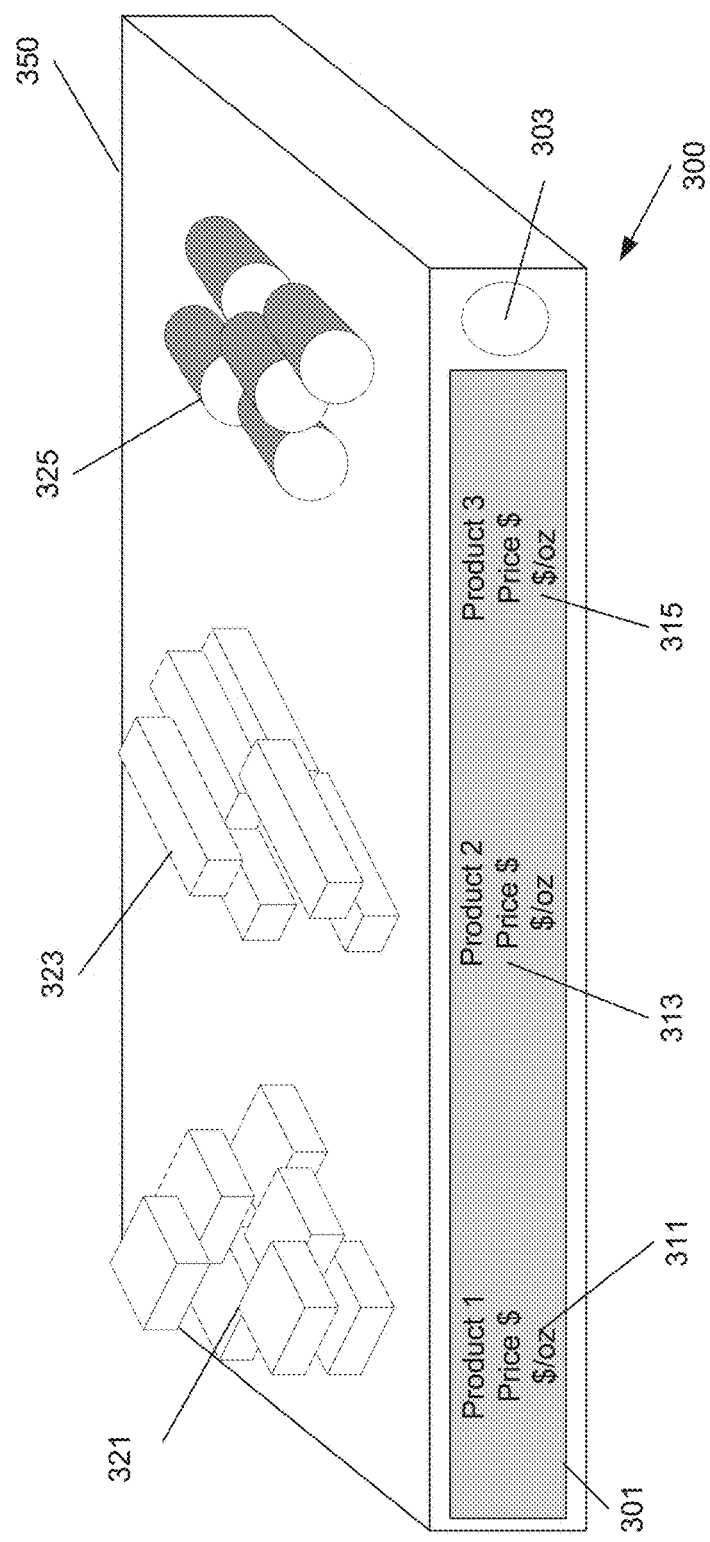
FIG. 3 illustrates an example block diagram of an apparatus for communicating and distributing content according to one or more illustrative aspects of the disclosure.

FIG. 3 illustrates an example block diagram of an apparatus for communicating and distributing content according to one or more illustrative aspects of the disclosure. FIG. 3 illustrates a continuous display shelf edge label device 300, such as continuous display shelf edge label devices 200A-200C. In this example, continuous display shelf edge label device 300 includes a single display area 301 oriented along an entire edge of a shelf 350. Continuous display shelf edge label device 300 also is shown to include a locking mechanism 303 that allows an individual to change modes of operation of the continuous display shelf edge label device 300 as described herein. In one mode, an authorized individual may edit one or more user interfaces 311, 313, and 315 while in a second mode, the user interfaces 311, 313, and 315 may not be edited.

The single continuous display 301 is shown to include three separate user interfaces that provide information regarding three separate products being offered for sale on the shelf 350. In this example, shelf 350 holds a first product 321, a second product 323, and a third product 325. Single continuous display 301 includes three digital user interfaces, one for each respective product being offered for sale. User interface 311 provides information about first product 321 directly above the user interface 311. Similarly, user interfaces 313 and 315 provide information about second product 323 and third product 325, respectively, that are above the respective user interfaces 313, 315. Any of a number of types of information about a product may be displayed on the single continuous display 301, including graphics, text, animations, video, and/or combinations.

Figure 4B:
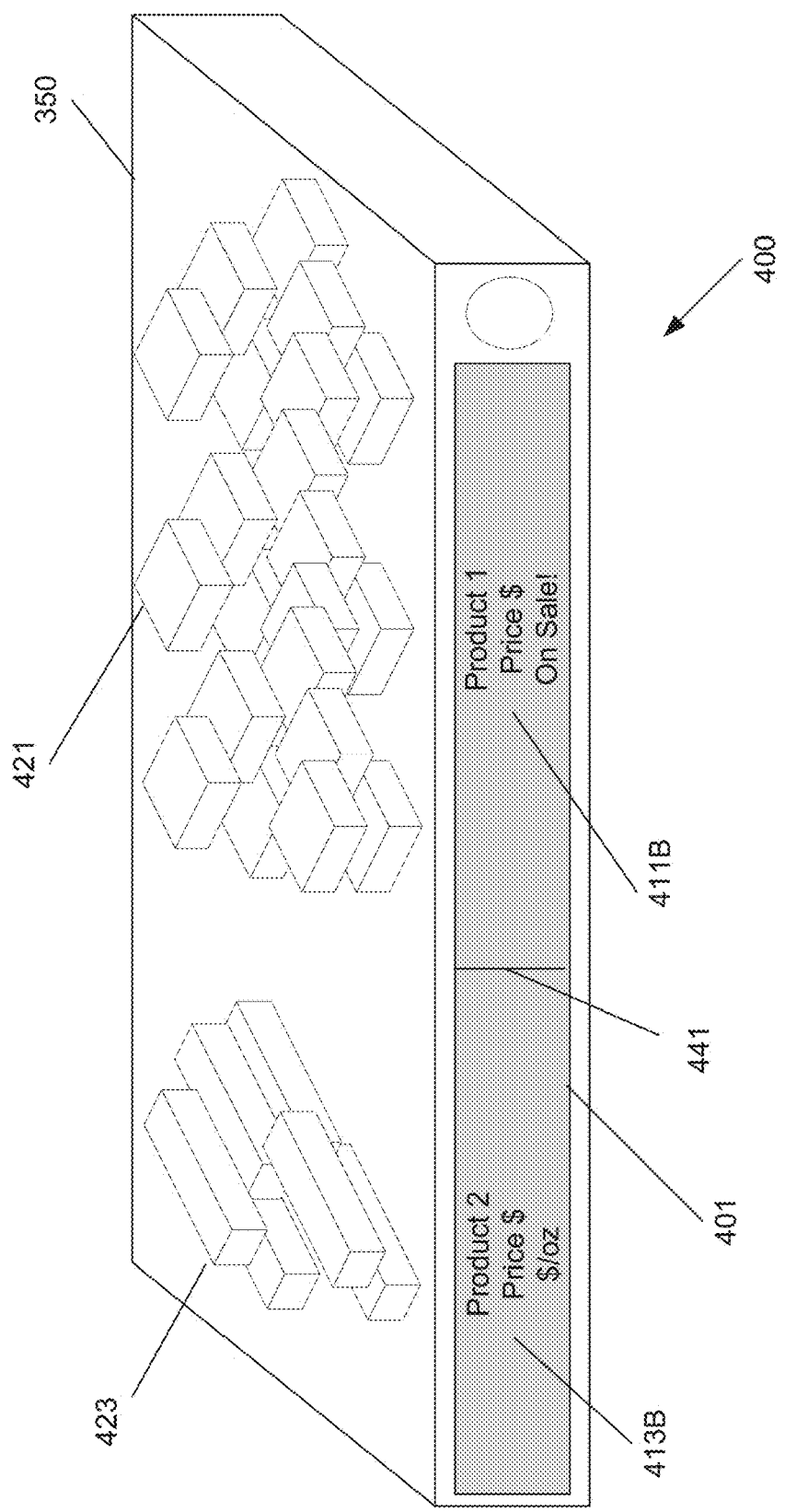

FIGS. 4A-4B illustrate an example of a changing continuous display according to one or more illustrative aspects of the disclosure. The transition from FIG. 4A to FIG. 4B illustrates one potential before and after operation of changing the user interfaces of a single continuous display. In FIG. 4A, a continuous display shelf edge label device 400 is shown for a shelf 350. Continuous shelf label device 400 may be one of continuous display shelf edge label devices 200A-200C and 300. Continuous display shelf edge label device 400 includes a single display area 401 oriented along an entire edge of shelf 350. The single continuous display 401 is shown to include three separate user interfaces that provide information regarding three separate products being offered for sale on the shelf 350.

For this illustrative example, a digital divider line 441 creates three separate visual frames for the three separate user interfaces 411A, 413A, and 415. Digital divider line is not a physical line that separates two displays, rather it is a digital line that creates the appearance of separation of the single continuous display 401 into multiple display areas. In this example, shelf 350 holds a first product 421, a second product 423, and a third product 425. Single continuous display 401 includes three digital user interfaces, one for each respective product being offered for sale. User interface 411A provides information about first product 421 directly above the user interface 411. User interface 413A provides information about second product 423 directly above user interface 413A, and user interface 415 provides information about third product 425 directly above user interface 415.

Transitioning to FIG. 4B, a worker may want to change the product layout for shelf 350 and in this example has removed the third product 425 from shelf 350 and created a larger area on shelf 350 for first product 421 to reside. Accordingly, the worker, as described herein, has changed the user interfaces for the single continuous display 401 in response. In this example, because the location of the user interfaces have been changed, user interface 411B is now shown to have moved toward the right side of the continuous display 401 since the first product 421 has been moved to the right side of shelf 350. Similarly, user interface 413B is shown to have been moved toward the left side of the continuous display 401 since the second product 423 has been moved to the left side of shelf 350. Because third product 425 is no longer being offered for sale on shelf 350, the user interface 415 for third product 425 has been deleted from continuous display 401. In this example of FIG. 4B, because there are only two user interfaces 411B and 413B shown on continuous display 401, only one digital divider line 441 is shown to frame out the two separate user interfaces 411B and 413B.

FIGS. 5A-5C illustrate example continuous displays with locking mechanism according to one or more illustrative aspects of the disclosure. As described herein, a locking mechanism may be included on a continuous display shelf edge label device in order to prevent an unauthorized individual from changing one or more parameters, such as displayed information, of a user interface displayed on the continuous display shelf edge label device. Any of a number of preventive manners may be included herein and the following are but some illustrative examples. In FIG. 5A, a manual device input 503A, such as for a physical key, may be included in a continuous display shelf edge label device 500A. By inserting a proper key, an authorized individual may change the mode of operation of the continuous display shelf edge label device from a display mode to a change mode.

A display mode may be a mode of operation where the continuous display shelf edge label device displays one or more interfaces on a single continuous display and may even allow a user, such as a customer, to access the single continuous display for additional information. Such an access may be by touch. However, in a display mode, such a customer cannot change a parameter of a user interface being displayed, such as the size of the user interface, the shape of the user interface, or the location of the user interface on the single continuous display. The customer can view and interact as allowed without having the ability to change parameters of the display area for the user interface. A change mode may be a mode of operation where the continuous display shelf edge label device displays one or more interfaces on a single continuous display and allows an authorized user, such as a worker, to change one or more parameters of the single continuous display. Such an access may be by touch as described herein. In a change mode, the worker can change a parameter of a user interface being displayed, such as the size of the user interface, the shape of the user interface, or the location of the user interface on the single continuous display. As such, a worker easily can modify any aspect of a user interface corresponding to a product at the point of sale.

FIGS. 5B and 5C illustrate two other types of locking mechanisms. In FIG. 5B, a biometric scanner 503B, such as to scan prints of a finger, may be included in a continuous display shelf edge label device 500B. By pressing a finger against the biometric scanner 503B, an authorized individual may change the mode of operation of the continuous display shelf edge label device from a display mode to a change mode. In FIG. 5C, a near field communication (NFC) reader 503C, such as to scan NFC enabled access cards of workers, may be included in a continuous display shelf edge label device 500C. By pressing an NFC enabled access card against the NFC reader 503C, an authorized individual may change the mode of operation of the continuous display shelf edge label device from a display mode to a change mode.

Figure 5D:
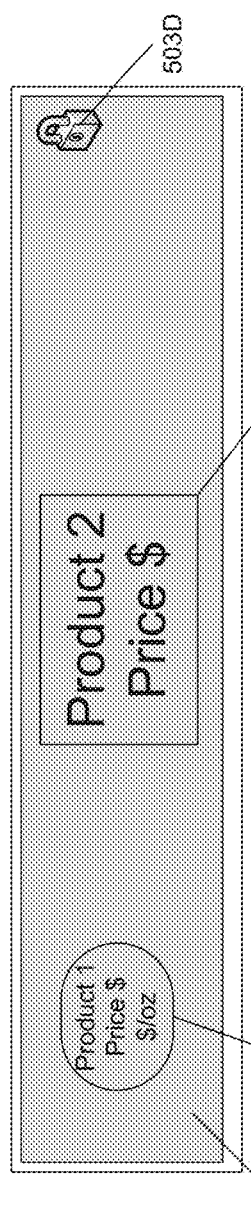
FIGS. 5D-5F illustrates an example of a changing continuous display with locking mechanism user interface according to one or more illustrative aspects of the disclosure.
Figure 5E:
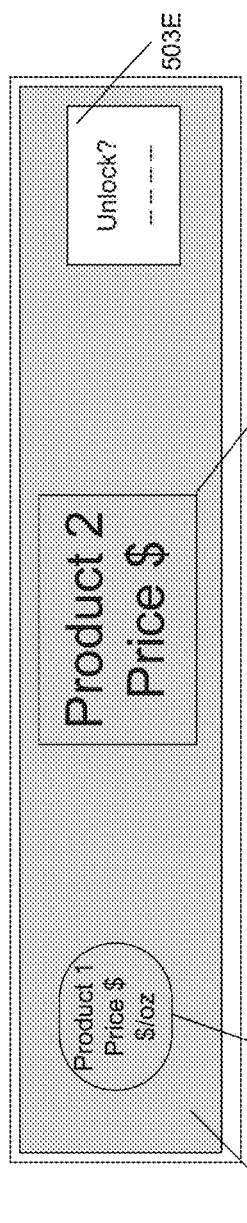
Figure 5F:
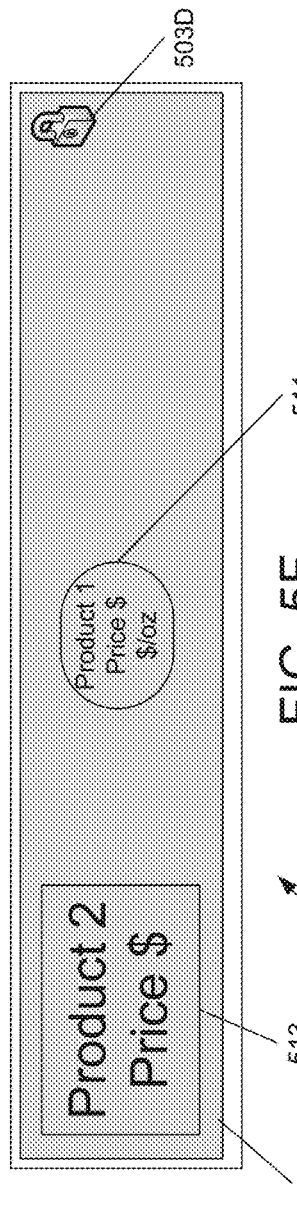

FIGS. 5D-5F illustrates an example of a changing continuous display with locking mechanism user interface according to one or more illustrative aspects of the disclosure. In the example of FIGS. 5D-5F, a locking mechanism is built into the continuous display shelf edge label device 500D. In this example, a worker will enter a code to change the mode of operation of the continuous display shelf edge label device 500D. As shown in FIG. 5D, a single continuous display 501D includes two user interfaces 511 and 513 for respective products. Also shown in FIG. 5D is a lock icon 503D. Accessing lock icon 503D allows an authorized individual to change modes of operation of continuous display shelf edge label device 500D. By tapping on lock icon 503D, the worker may be shown what is seen in FIG. 5E. In FIG. 5E, a new user interface 503E appears that prompts an individual for entry of a code to authorize the changing of the modes of operation. By inserting a proper code in FIG. 5E, an authorized individual may change the mode of operation of the continuous display shelf edge label device 500D from a display mode to a change mode.

If the individual does not enter a proper code, the continuous display shelf edge label device 500D may transition back to the appearance shown in FIG. 5D. However, if the individual does enter a proper code, the continuous display shelf edge label device 500D may change modes of operation to a change mode allowing the individual to change one or more parameters of one or more user interfaces for products. Following any changes, the individual does not enter a proper code, the continuous display shelf edge label device 500D may transition back to a display mode as shown in FIG. 5F. As shown, the individual has changed the location of user interface 511 and user interface 513 with respect to each other on the single continuous display 501D. Locking icon 503D is shown as well.

Figure 6A:
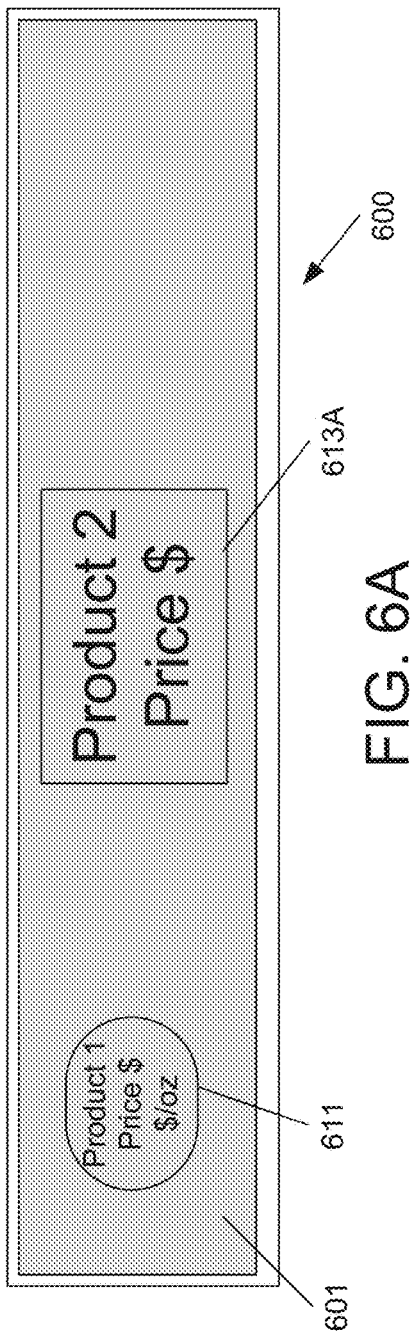
FIGS. 6A-6B illustrate an example of a changing size of a user interface according to one or more illustrative aspects of the disclosure.
Figure 6B:
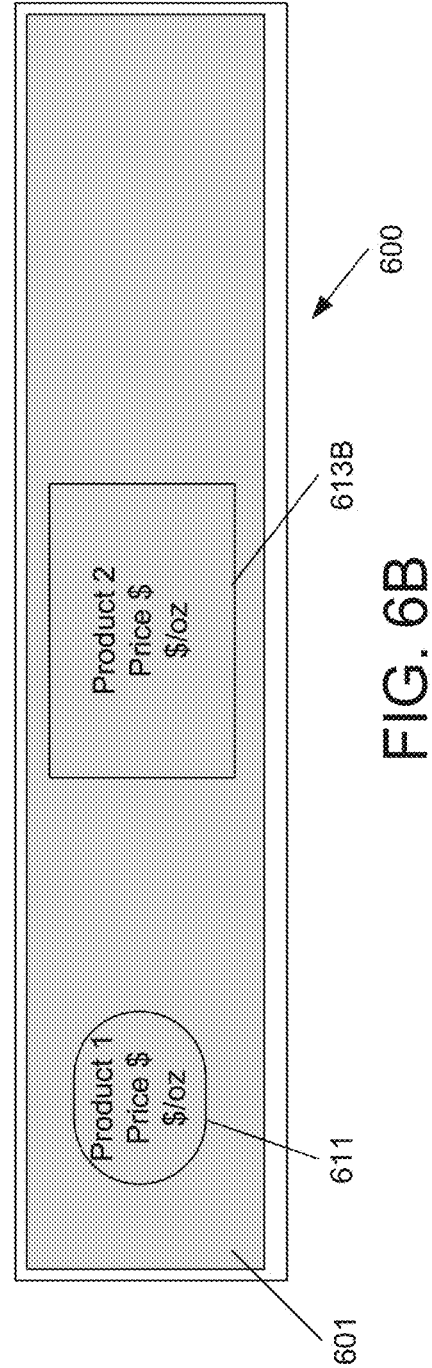

FIGS. 6A-6B illustrate an example of a changing size of a user interface according to one or more illustrative aspects of the disclosure. In this illustrative example, an authorized individual has accessed a change of mode request in the continuous display shelf edge label device 600. In this example, continuous display shelf edge label device 600 includes a single continuous display 601 oriented along an entire edge of a shelf. FIG. 6A may illustrate two user interfaces 611 and 613A prior to a change of a parameter of the user interface 613A. In this example, the shape of the border of each user interface 611 and 613A are different as well has the size of the text within the border. Through one or more of the operations described herein, FIG. 6B illustrates what the continuous display shelf edge label device 600 may resemble after a change operation to change the size of the user interface 613A. As shown in FIG. 6B, user interface 613B has the text within it reduced in size. Transitioning from FIG. 6A to FIG. 6B, an authorized individual has changed a parameter, the large size of text, of user interface 613A to the parameter, the smaller size of text, of user interface 613B.

Figure 7A:
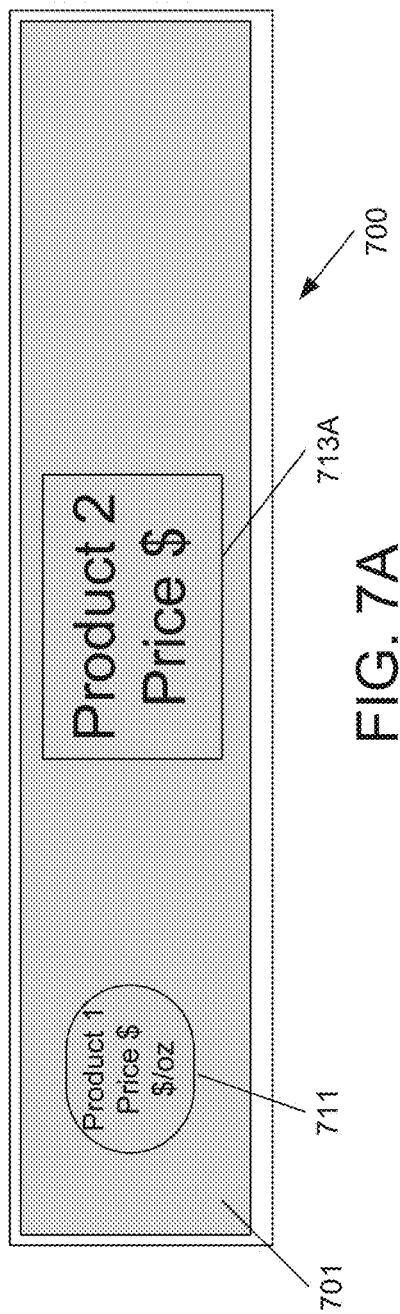
FIGS. 7A-7B illustrate an example of a changing shape of a user interface according to one or more illustrative aspects of the disclosure.
Figure 7B:
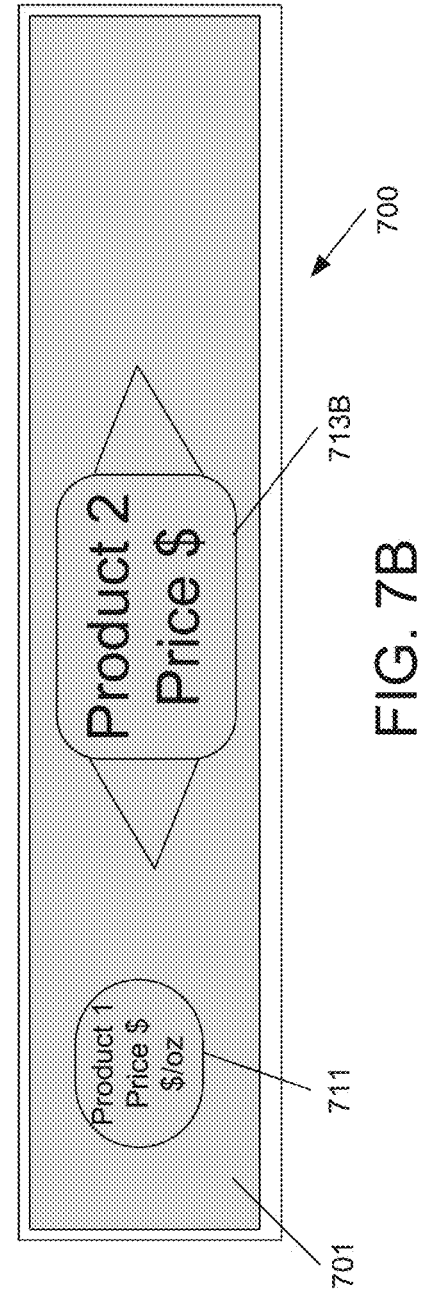

FIGS. 7A-7B illustrate an example of a changing shape of a user interface according to one or more illustrative aspects of the disclosure. In this illustrative example, an authorized individual has accessed a change of mode request in the continuous display shelf edge label device 700. In this example, continuous display shelf edge label device 700 includes a single continuous display 701 oriented along an entire edge of a shelf. FIG. 7A may illustrate two user interfaces 711 and 713A prior to a change of a parameter of the user interface 713A. In this example, the shape of the border of each user interface 711 and 713A are different as well has the size of the text within the border. Through one or more of the operations described herein, FIG. 7B illustrates what the continuous display shelf edge label device 700 may resemble after a change operation to change the shape of the border of user interface 713A. As shown in FIG. 7B, user interface 713B has the shape of the border of the user interface different in appearance. Transitioning from FIG. 7A to FIG. 7B, an authorized individual has changed a parameter, the rectangular shape, of the border of user interface 713A to the parameter, the rounded edge cornered rectangle with pointed ends shape, of the border of user interface 713B.

FIGS. 8A-8B illustrate an example of a changing location of user interfaces according to one or more illustrative aspects of the disclosure. In this illustrative example, an authorized individual has accessed a change of mode request in the continuous display shelf edge label device 800. In this example, continuous display shelf edge label device 800 includes a single continuous display 801 oriented along an entire edge of a shelf. FIG. 8A may illustrate two user interfaces 811A and 813A prior to a change of a parameter of the user interfaces 811A and 813A. In this example, the position of each user interface 811A and 813A within the single continuous display 801 are changed. Through one or more of the operations described herein, FIG. 8B illustrates what the continuous display shelf edge label device 800 may resemble after a change operation to change the position of the two user interfaces 811A and 813A. As shown in FIG. 8B, user interface 813B has changed positional orientation with respect to user interface 811B within the single continuous display 801. Transitioning from FIG. 8A to FIG. 8B, an authorized individual has changed two parameters, the positions of each of the user interfaces 811A and 813A to the two parameters, the positions of each of the user interfaces 811B and 813B.

Figure 9:
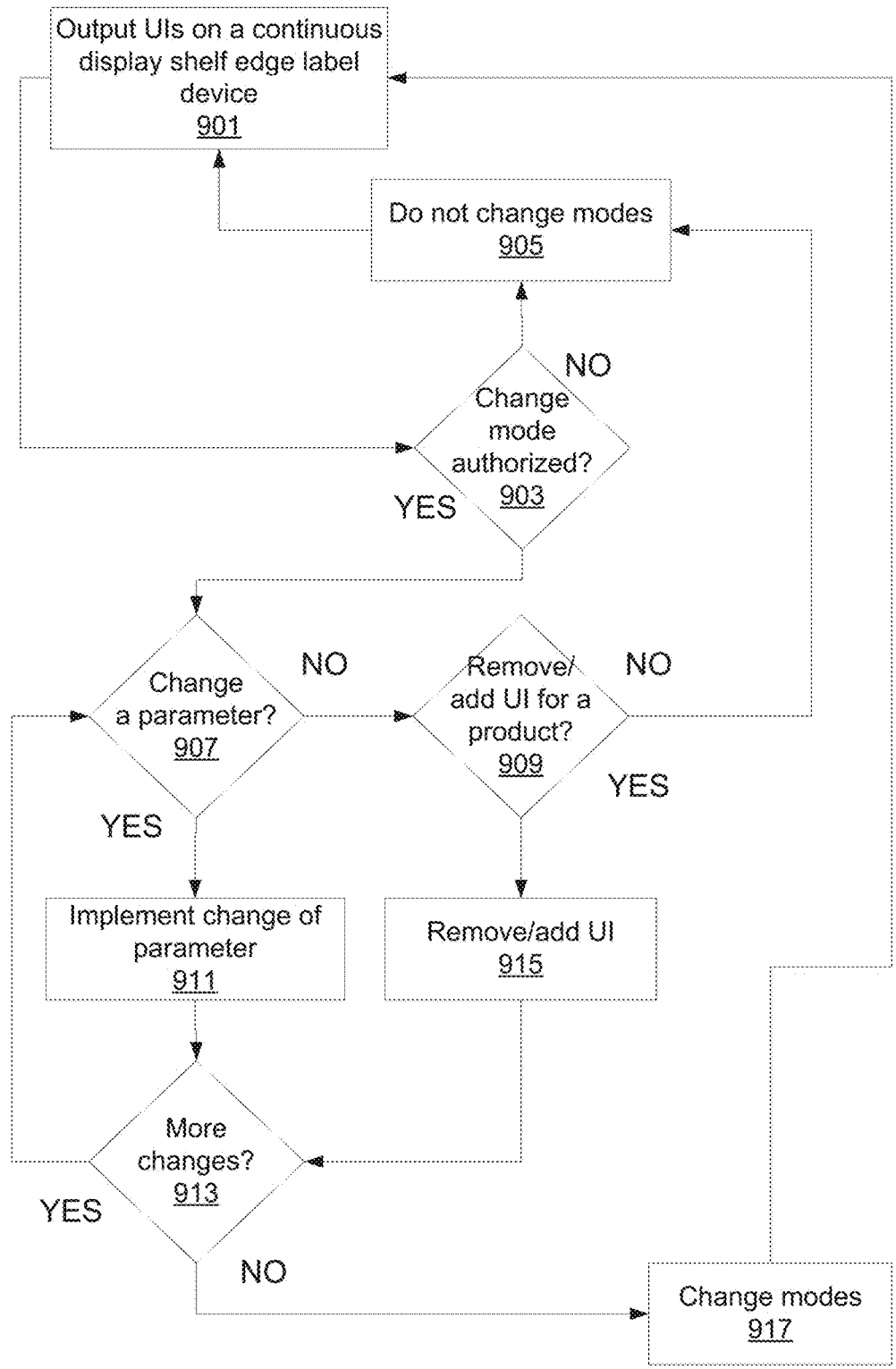
FIG. 9 illustrates an example method of distributing content according to one or more illustrative aspects of the disclosure.

FIG. 9 illustrates an example method of distributing content according to one or more illustrative aspects of the disclosure. In one example, one or more of the steps of FIG. 9 may be implemented by computing device 100 in FIG. 1 and/or a device shown in FIGS. 2A-8B. The process starts and at step 901 a continuous display shelf edge label device outputs, via a single continuous display, two or more user interfaces, each user interface corresponding to a product being offered for sale. Such an example is shown in FIG. 3. Proceeding to step 903 a determination is made as to whether a change of mode of the continuous display shelf edge label device has been authorized. Such an example may be a worker inserting placing her finger at biometric scanner 503B in FIG. 5B and having the system realize that she is authorized to change the mode of operation of the continuous display shelf edge label device.

If the change of mode of operation is not authorized in step 903, the process moves to step 905 where there is no instruction to change the mode of operation and the process returns to step 901 to output, via the single continuous display, two or more user interfaces, each user interface corresponding to a product being offered for sale. If the change of mode of operation is authorized in step 903, the process moves to step 907 where an additional determination is made. In step 907 a determination is made as to whether a change of parameter input has been received. An illustrative example of a change of parameter is shown with respect to FIGS. 6A and 6B, FIGS. 7A and 7B, and/or FIGS. 8A and 8B. If there is not change of parameter input received, the process moves to step 909. If a change of parameter input is received in step 907, the process move to step 911 where the change of parameter, such as increasing the size of text of a user interface, is implemented on the requested user interface. The process then proceeds to step 913.

Returning to step 909, a further determination is made as to whether an input has been received to remove and/or add a user interface for a product. Such an illustrative example is shown with the removal of user interface 415 from FIG. 4A to FIG. 4B. If no input has been received in step 909, the process may return to step 905 and further may exit from a change mode of operation to a display mode of operation before returning to step 901. If an input is received in step 909, the process moves to step 915 where the user interface that the input applies to is either added or removed based upon the input. The process then proceeds to step 913.

In step 913 a determination is made as to whether additional changes in the change mode of operation are requested. If there are additional changes requested, the process may return to step 907. If additional changes are not requested, the process proceeds to step 917. In step 917, operation of the continuous display shelf edge label device from a change mode of operation to a display mode of operation occurs before returning to step 901 to output, via the single continuous display, two or more user interfaces, each user interface corresponding to a product being offered for sale and in accordance with any changes that may have been implemented.

Figure 10:
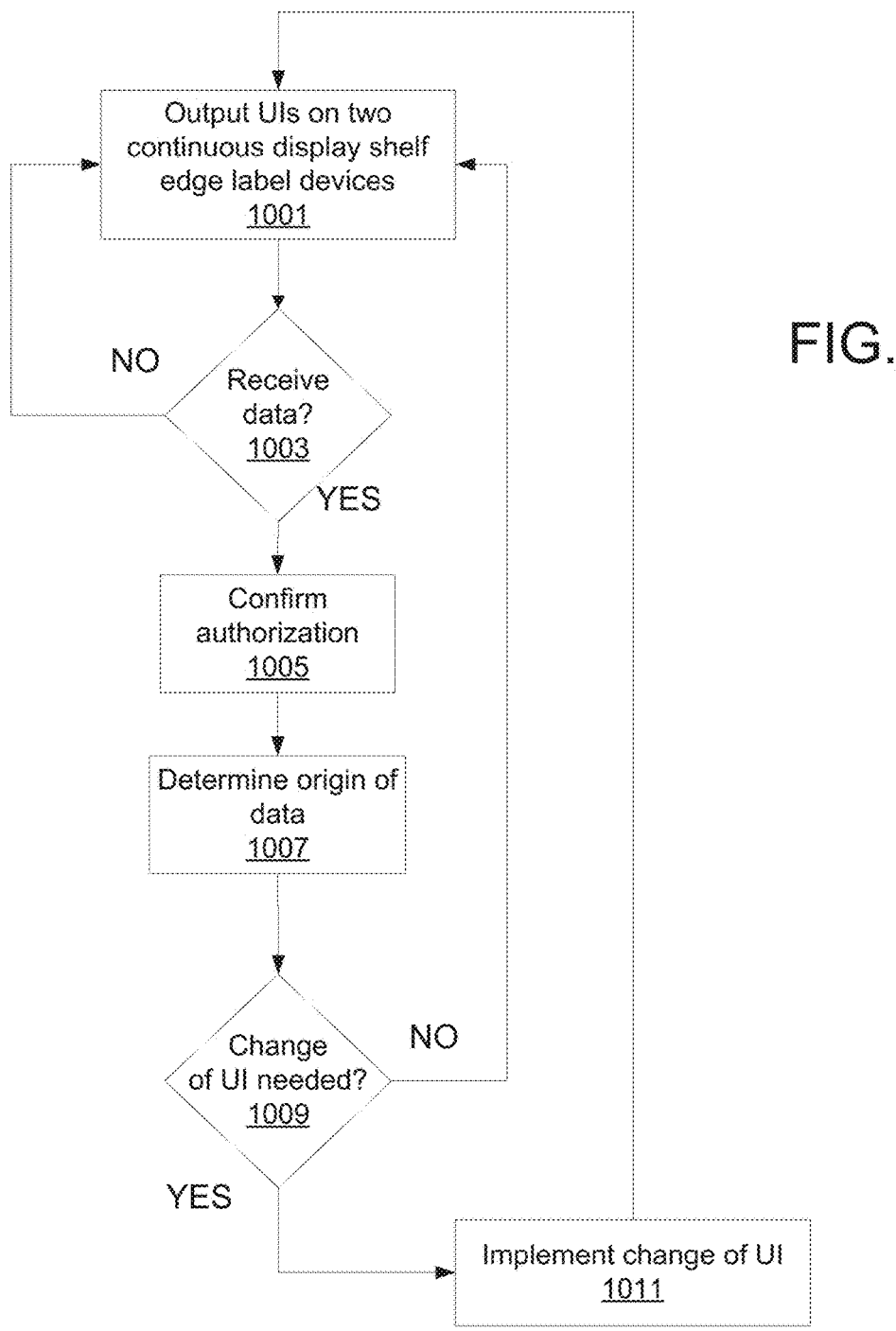
FIG. 10 illustrates another example method of distributing content according to one or more illustrative aspects of the disclosure.

FIG. 10 illustrates another example method of distributing content according to one or more illustrative aspects of the disclosure. In one example, one or more of the steps of FIG. 10 may be implemented by computing device 100 in FIG. 1 and/or a device shown in FIGS. 2A-8B. The process starts and at step 1001 two continuous display shelf edge label devices each outputs, via a single continuous display, two or more user interfaces, each user interface corresponding to a product being offered for sale. Such an example is shown in FIG. 2B. Proceeding to step 1003, a determination is made as to whether data is being received by one of the continuous display shelf edge label devices. If not, the process may return to step 1001. If data is being received in step 1003, the process moves to step 1005.

In step 1005 the continuous display shelf edge label device confirms the authorization of the data. For example, the system may confirm that the data being received is for the continuous display shelf edge label device. If the data is a global transmission from a database, such as database 223 in FIG. 2A, the continuous display shelf edge label device may determine that the data being received in step 1003 is not intended for the continuous display shelf edge label device. Upon confirming he authorization of the data in step 1005, the process moves to step 1007 where the origin of the data may be determined. For example, the continuous display shelf edge label device may determine that the data is being received locally from a wireless communication received from a scanner, such as scanner 221 in FIG. 2A. In another example, the continuous display shelf edge label device may determine that the data is being received remotely from a wired communication received from a user terminal, such as user terminal 227 through main hub 225 and network 210 in FIG. 2A.

Moving to step 1009, a determination may be made as to whether a change to one or more user interfaces currently being outputted, via a single continuous display, by the continuous display shelf edge label device is needed. For example, if the data received in step 1003 and confirmed as applying to the continuous display shelf edge label device in step 1005 may include a change in price of a product associated with a user interface being outputted. If no change is needed in step 1009, the process may return to step 1001. If a change to one or more user interfaces currently being outputted, via the single continuous display, by the continuous display shelf edge label device is needed in step 1009, the process moves to step 1011 where the one or more changes to one or more user interfaces currently being outputted, via the single continuous display, by the continuous display shelf edge label device is implemented. Thereafter, the process may return to step 1001 where the two continuous display shelf edge label devices each outputs, via a single continuous display, two or more user interfaces, each user interface corresponding to a product being offered for sale, where each user interface of the continuous display shelf edge label device that received data in step 1003 outputs one or more user interfaces in accordance with any changes that may have been implemented in step 1011.

Figure 11:
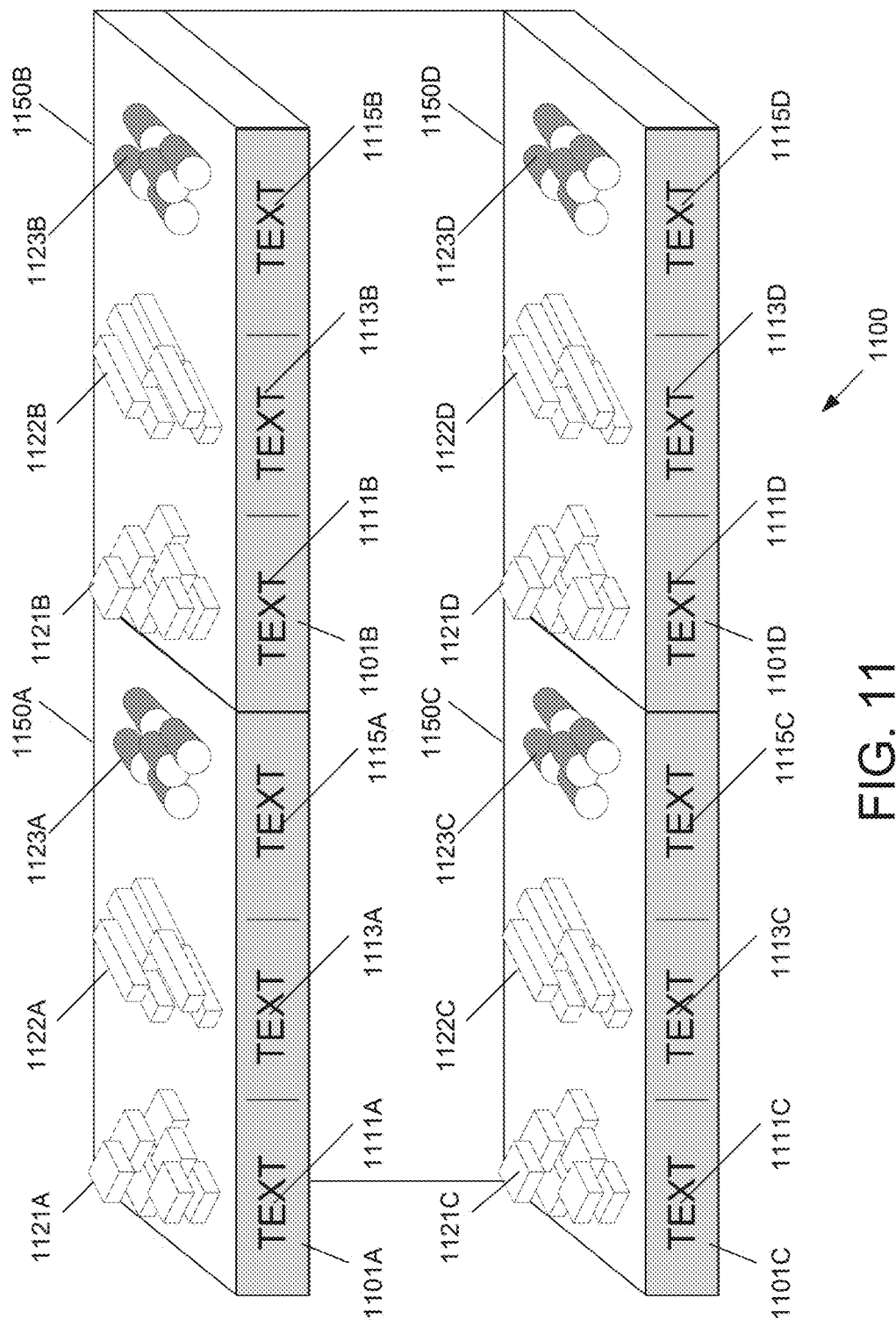
FIG. 11 illustrates an example block diagram of a system for communicating and distributing content according to one or more illustrative aspects of the disclosure.

FIG. 11 illustrates an example block diagram of a system for communicating and distributing content according to one or more illustrative aspects of the disclosure. In one example, one or more of the components of FIG. 11 may be implemented by computing device 100 in FIG. 1 and/or one or more of devices shown in FIGS. 2A-10. In this example, a system 1100 of multiple continuous display shelf edge label devices are shown in operation together. In this example, there are four continuous display shelf edge label devices. Each continuous display shelf edge label device includes a single display area 1101A-1101D oriented along an entire edge of a shelf 1150A-1150D. Further in this example, shelves 1150A-D each hold a first product 1121A-1121D, a second product 1123A-D, and a third product 1125A-D, respectively. Single continuous displays 1101A-D each includes three digital user interfaces, one for each respective product being offered for sale. User interfaces 1111A-D provide information about first product 1121A-D directly above the user interface 1111A-D, respectively. Similarly, user interfaces 1113A-D and 1115A-D provide information about second product 1123A-D and third product 1125A-D, respectively, that are above the respective user interfaces 1113A-D, 1115A-D.

In accordance with one or more aspects of the present disclosure, the various continuous display shelf edge label devices could operate in unison for providing additional information to a customer. By having the continuous display shelf edge label devices arranged in side by side (1101A and 1101B or 1101C and 1101D) orientation and stacked on top of each other like shelves (1101A and 1101C or 1101B and 1101D), an array of continuous display shelf edge label devices may be configured. In the illustrative example of FIG. 11, there are four continuous display shelf edge label devices arranged as an array of 2×2, two rows and two columns of continuous display shelf edge label devices. Any of a number of additional arrangements may be made, including, but not limited to 4×1, 3×4, 3×3, and 4×4 configurations.

By configuring various continuous display shelf edge label devices to operate together, a retailer may utilize the displays to attract customers in any of a number of desired manners. Such configurations may be utilized to promote a single product, a single type of product, a single brand name, and the like. Animations and/or graphics may be implemented that span across multiple continuous display shelf edge label devices. Different outputs on the displays of the continuous display shelf edge label devices may be implemented based upon detecting the presence of a customer at an aisle, near a particular continuous display shelf edge label device, and/or at some other location in a retailer store. As described herein, different display modes may be implemented depending on the desired result and/or effect.

In one such example, every 10-15 seconds the display on one or more continuous display shelf edge label devices may change what is outputted in some way. In still other examples, one or more continuous display shelf edge label devices may remain constant in a displayed output acting as a very vibrant billboard. Whether the displayed output is moving or serving as a more constant billboard, continuous display shelf edge label devices could operate together.

In one embodiment, a customer may see and be attracted to such changing displayed output or stationary displayed output from further away. The changing displayed output or stationary displayed output may be a first display mode of operation. In response, she may approach a shelf. As she approaches the shelf, one or more continuous display shelf edge label devices may sense her presence, such as by a proximity sensor, and may switch to another mode of display. In such an example, specific advertising for a product may appear, such as for a product associated with the continuous display shelf edge label devices. Such advertising may be a notice of the product being on sale. Once the customer is in front of a particular continuous display shelf edge label device for a given period of time, such as 3-5 seconds, the continuous display shelf edge label device may switch to yet another mode of display where SKU specific pricing and packaging information may appear under each product.

In still other illustrative embodiments, a continuous display shelf edge label device may operate with a pusher assembly that is included with a shelf on which the continuous display shelf edge label device is oriented. The pusher assembly may include a pusher configured to place pressure behind a stack of products and push the stack forward towards the front of the shelf when a product is removed from the stack. Such a pusher assembly may include one or more components to determine a position of the pusher with respect to some portion of the assembly. For example, the stack of products may be able to fit 10 products. Integrated in the pusher assembly may be a floor that includes a tracker component at each of the 10 positions that the pusher may be configured to operate with the product. As the pusher reaches a tracker component, data regarding the position of the pusher may be known and such data may be transmitted to the continuous display shelf edge label device.

Similarly, other data may be determined and transferred as needed as well. For example, a movement of the pusher with respect to the shelf and/or the pusher assembly may be determined. Such a determination may be based upon a position and may include a timer component for use in determining the movement. In addition, in still other examples, a rate of change in a product level of a product associated with the continuous display shelf edge label device may be determined. In such an example, a shelf originally stocked with 50 items of a product is determined to only have 15 items of the product remaining after a period of time, such as an hour, a notice may be sent to a worker of the retailer to restock the product on the shelf. Similarly, such data may be sent to a continuous display shelf edge label device for changing a user interface associated with the product. For the same example, having received the data regarding only 15 items of a product remaining, the user interface of the continuous display shelf edge label device may be configured to change information. In some examples, a flashing/blinking display output of "Final 15 Left In Stock!" may be displayed, or a display output may automatically lower the price on the user interface by 10%, or a display may flash/blink upon determining the presence of a worker in the area of the continuous display shelf edge label device. The continuous display shelf edge label device may sense the presence of a worker, such as by sensing a NFC enabled access card of the worker being within a sensing range of a sensor associated with and/or included within the continuous display shelf edge label device.

Other data may be communicated to and/or determined by a continuous display shelf edge label device from a pusher and/or a pusher assembly. For example, a continuous display shelf edge label device may be programmed with data about a product that it is associated with and/or may access such data from a local or remote source, such as database 223 in FIG. 2A. In one example, the product may have an expiration data. For example, the product may be milk and the particular products on the shelf for sale may all have a same expiration date. A threshold may be established to track the number of milk items remaining against the expiration date in order to move the milk items off of the shelf, whether to customers or for newer milk items with later expiration dates. In one scenario, the system may lower the price of the milk as the time until the expiration date is met lowers to a threshold. If the expiration date is a week away, the continuous display shelf edge label device may output a price for the milk of $2. When the expiration date is 4 days away, the price may be reduced by 10% or dropped in price by $0.25. Should some milk remain when the expiration date is 2 days away, the price may be reduced by 50% or dropped in price by $1. In still other scenarios, as the expiration date approaches a threshold, notice may be provided in some manner to a worker for the retailer. The worker may receive a text or email, a notice on a handheld scanner, and/or in some other manner that the milk needs to be replaced or may soon need to be replaced.

Other illustrative information about a product may be communicated to and/or determined by a continuous display shelf edge label device from a pusher and/or a pusher assembly as well. Such examples include determining the amount of product remaining for another product and changing a user interface of the continuous display shelf edge label device in response. For example, a continuous display shelf edge label device may determine or receive data from another continuous display shelf edge label device about a competitive product and/or related product (such as toothpastes to toothbrushes). Utilizing such data, the continuous display shelf edge label device may change a user interface for a product associated with it, such as the price of the product, accordingly. In this manner, algorithms may be established for handling when and under what circumstances a price change may occur automatically at the continuous display shelf edge label device. The continuous display shelf edge label device may access a remote source for authorization to do so and/or make the determination itself that the user interface for a product should be changed. Accordingly, a price reduction may occur for a product if it is determined that a competitor's product is moving off a shelf in a much quicker manner than the product is moving.

The various features described above are merely non-limiting examples, and can be rearranged, combined, subdivided, omitted, and/or altered in any desired manner. For example, features of the computing device described herein (which may be one the devices illustrated in FIG. 1) can be subdivided among multiple processors and computing devices. The true scope of this patent should only be defined by the claims that follow.

What is claimed:

1. An apparatus comprising:
   at least one processor;
   a digital display wherein the digital display is a single continuous display oriented along an entire edge of a shelf of a retailer, the digital display configured to:
      output, a plurality of information from a first display mode of operation,
      provide a user interface, and
      permit, an individual to edit a parameter of the user interface;
   at least one memory storing computer executable instructions that, when executed by the at least one processor, cause the apparatus to output, to the digital display, the plurality of information; and
   a wireless communication interface configured to receive data representative of the plurality of information from a wireless network.

2. The apparatus of claim 1, wherein the digital display is configured to be removed from the entire edge of a shelf of the retailer.

3. The apparatus of claim 1, wherein the digital display is a touchscreen display, and wherein the digital display is further configured to permit the individual by touch to edit the parameter of the user interface by touching the digital display.

4. The apparatus of claim 1, wherein the digital display is further configured to operate together with a plurality of digital displays.

5. The apparatus of claim 1, further comprising a proximity sensor.

6. The apparatus of claim 5, wherein the proximity sensor is configured to detect a presence of a customer, wherein the first display mode of operation switches to a second display mode of operation upon detection of the presence of the customer, and wherein the digital display outputs a plurality of information from the second display mode of operation.

7. The apparatus of claim 6, wherein the proximity sensor detects that the customer is in front of the digital display, wherein the second display mode of operation switches to a third display mode of operation upon detection of the customer in front of the digital display, and wherein the digital display outputs a plurality of information from the third display mode of operation.

8. The apparatus of claim 1, wherein the plurality of information from the first display mode of operation is a video, a promotion, dynamic content, animation, graphics, text, a brand name, a type of product, an advertisement for a product, sale information, pricing information, or packaging information.

9. The apparatus of claim 6, wherein the plurality of information from the second display mode of operation is a video, a promotion, dynamic content, animation, graphics, text, a brand name, a type of product, an advertisement for a product, sale information, pricing information, or packaging information.

10. The apparatus of claim 7, wherein the plurality of information from the third display mode of operation is a video, a promotion, dynamic content, animation, graphics, text, a brand name, a type of product, an advertisement for a product, sale information, pricing information, or packaging information.

11. The apparatus of claim 7, wherein the digital display is further configured to automatically change the plurality of information output by the digital display, and wherein the plurality of information includes a price.

12. The apparatus of claim 1, further comprising at least one camera configured for a capture of imaging.

13. The apparatus of claim 1, further configured to determine an amount of a product remaining on the shelf of the retailer.

14. A method comprising:
   providing on a shelf of a retailer a shelf edge label digital display configured to be removably mounted along an edge of the shelf wherein the digital display is a single continuous display;
   outputting on the digital display a plurality of information from a first display mode of operation;
   providing on the digital display a user interface;
   permitting an individual to edit a parameter of the user interface; and
   providing a wireless communication interface configured to receive data representative of the plurality of information from a wireless network.

15. The method of claim 14, wherein the digital display is a touchscreen display, and wherein the permitting, through the display, the individual to edit the parameter of the user interface by touching the touchscreen display.

16. The method of claim 14, further comprising the digital display operating together with a plurality of digital displays.

17. The method of claim 14, further comprising providing a proximity sensor, wherein the proximity sensor is configured to detect a presence of a customer, wherein the outputting on the digital display the plurality of information from the first display mode of operation switches to outputting a plurality of information from a second display mode of operation upon detection of the presence of the customer.

18. The method of claim 17, wherein the proximity sensor is further configured to detect that the customer is in front of the digital display, wherein the outputting on the digital display the plurality of information from the second display mode of operation switches to outputting a plurality of information from a third display mode of operation upon detection of the customer in front of the digital display.

19. The method of claim 14, wherein the outputting of the plurality of information from the first display mode of operation is a video, dynamic content, a promotion, animation, graphics, text, a brand name, a type of product, an advertisement for a product, sale information, pricing information, or packaging information.

20. The method of claim 17, wherein the outputting of the plurality of information from the second display mode of operation is a video, dynamic content, a promotion, animation, graphics, text, a brand name, a type of product, an advertisement for a product, sale information, pricing information, or packaging information.

21. The method of claim 18, wherein the outputting of the plurality of information from the third display mode of operation is a video, dynamic content, a promotion, animation, graphics, text, a brand name, a type of product, an advertisement for a product, sale information, pricing information, or packaging information.

22. The method of claim 18, further comprising automatically changing the plurality of information output by the digital display, and wherein the plurality of information includes a price.

23. The method of claim 14, further comprising providing at least one camera for the capture of imaging.

24. The method of claim 14, further comprising determining an amount of a product remaining on the shelf of the retailer.

25. One or more non-transitory computer-readable media having instructions stored thereon associated with a digital display, wherein the digital display is a single continuous display and configured to be removably mounted along an entire edge of a shelf of a retailer, that, when executed, cause at least one computing device to:
 output to the digital display a plurality of information from a first display mode of operation;
 output to the digital display a plurality of information from a second display mode of operation;
 output to the digital display a plurality of information from a third display mode of operation;
 provide a user interface;
 permit, an individual to edit a parameter of the user interface; and
 receive data representative of the plurality of information from a wireless network.

* * * * *